US012184965B2

(12) United States Patent
Gummadi et al.

(10) Patent No.: US 12,184,965 B2
(45) Date of Patent: *Dec. 31, 2024

(54) UNDER-DISPLAY CAMERA AND SENSOR CONTROL

(71) Applicant: QUALCOMM Incorporated, San Diego, CA (US)

(72) Inventors: Bapineedu Chowdary Gummadi, Hyderabad (IN); Soman Ganesh Nikhara, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,922

(22) Filed: May 12, 2023

(65) Prior Publication Data

US 2023/0328360 A1    Oct. 12, 2023

Related U.S. Application Data

(63) Continuation of application No. 17/068,412, filed on Oct. 12, 2020, now Pat. No. 11,706,520.

(51) Int. Cl.
*H04N 13/254* (2018.01)
*G06T 3/40* (2006.01)
(Continued)

(52) U.S. Cl.
CPC ............. *H04N 23/631* (2023.01); *G06T 3/40* (2013.01); *G06T 7/55* (2017.01); *G06T 11/00* (2013.01);
(Continued)

(58) Field of Classification Search
CPC ........... H04N 5/232933; H04N 5/2257; H04N 5/23216; H04N 5/23229; H04N 5/232939;
(Continued)

(56) References Cited

U.S. PATENT DOCUMENTS 8,022,977 B2   9/2011  Kanade et al.
8,754,927 B2   6/2014  Fritsch et al.
(Continued)

FOREIGN PATENT DOCUMENTS

CN    106936958 A    7/2017
CN    110581910 A   12/2019
(Continued)

OTHER PUBLICATIONS

Byford S, "Oppo Unveils the world's first under-screen selfie camera", The Verge, Jun. 26, 2019, 4 Pages.
Humphries M, "Xiaomi Explains How Its Under-Screen Camera Works", PCMag, Jun. 10, 2019, 3 Pages.
International Search Report and Written Opinion—PCT/US2021/049891—ISA/EPO—Mar. 1, 2022.
(Continued)

*Primary Examiner* — Howard D Brown, Jr.
(74) *Attorney, Agent, or Firm* — QUALCOMM Incorporated

(57) ABSTRACT

An under-display camera is positioned underneath a display of a mobile device. The under-display camera captures an image using light passing through a portion of the display. The mobile device displays a display image on the display, the display image based on the image. The mobile device displays an indicator overlaid over the display image on an indicator area of the display that overlaps with the portion of the display. The indicator may identify the position of the camera. The mobile device can compensate for occlusion of the camera by continuing to display a previous display image if a more recently captured image includes an occlusion. The mobile device can give users alternate ways to select areas of the display image to avoid camera occlusion, for instance using hardware buttons and/or touchscreen interface elements.

30 Claims, 15 Drawing Sheets

(51) Int. Cl.

| | |
|---|---|
| *G06T 7/55* | (2017.01) |
| *G06T 11/00* | (2006.01) |
| *G06T 13/80* | (2011.01) |
| *H04N 5/272* | (2006.01) |
| *H04N 23/57* | (2023.01) |
| *H04N 23/62* | (2023.01) |
| *H04N 23/63* | (2023.01) |
| *H04N 23/80* | (2023.01) |
| *G06F 3/01* | (2006.01) |
| *G06F 3/04842* | (2022.01) |
| *G06F 3/04883* | (2022.01) |
| *G06F 3/16* | (2006.01) |

(52) U.S. Cl.
CPC ............ *G06T 13/80* (2013.01); *H04N 5/272* (2013.01); *H04N 23/57* (2023.01); *H04N 23/62* (2023.01); *H04N 23/633* (2023.01); *H04N 23/80* (2023.01); *G06F 3/017* (2013.01); *G06F 3/04842* (2013.01); *G06F 3/04883* (2013.01); *G06F 3/167* (2013.01); *G06T 2200/24* (2013.01); *G06T 2210/22* (2013.01)

(58) Field of Classification Search
CPC .. H04N 5/272; G06T 3/40; G06T 7/55; G06T 11/00; G06T 13/80; G06T 2200/24; G06T 2210/22; G06F 3/017; G06F 3/04842; G06F 3/04883; G06F 3/167
See application file for complete search history.

(56) References Cited

U.S. PATENT DOCUMENTS

| | | | |
|---|---|---|---|
| 9,057,931 B1* | 6/2015 | Baldwin | G03B 17/48 |
| 10,986,321 B1* | 4/2021 | Hedges | A61B 1/045 |
| 2008/0287742 A1* | 11/2008 | St. George | H04N 7/18 |
| | | | 600/160 |
| 2011/0313245 A1* | 12/2011 | Scholly | A61B 1/00105 |
| | | | 600/109 |
| 2020/0134282 A1* | 4/2020 | Tian | G06F 3/0412 |
| 2020/0137314 A1* | 4/2020 | Miao | H04N 23/631 |
| 2020/0209729 A1* | 7/2020 | Chen | G03B 21/62 |
| 2020/0389575 A1* | 12/2020 | Gove | H04N 13/239 |
| 2020/0401781 A1* | 12/2020 | Haddad | G06V 40/1318 |
| 2021/0176383 A1* | 6/2021 | Kim | G06V 40/18 |
| 2021/0397320 A1* | 12/2021 | Ye | G06F 3/0448 |
| 2022/0116546 A1* | 4/2022 | Gummadi | H04N 23/57 |

FOREIGN PATENT DOCUMENTS

| | | |
|---|---|---|
| CN | 110730298 A | 1/2020 |
| CN | 110730299 A | 1/2020 |
| EP | 3739424 A1 | 11/2020 |
| EP | 3796215 A1 | 3/2021 |
| WO | 2019149208 A1 | 8/2019 |

OTHER PUBLICATIONS

Partial International Search Report—PCT/US2021/049891—ISA/EPO—Jan. 7, 2022.

* cited by examiner

UNDER-DISPLAY CAMERA AND SENSOR CONTROL

CROSS-REFERENCE TO RELATED APPLICATIONS

This application is a continuation of U.S. Non-Provisional application Ser. No. 17/068,412, filed, Oct. 12, 2020, which is hereby incorporated by reference, in its entirety and for all purposes.

FIELD

This application is related to image capture and image processing. More specifically, this application relates to technologies and techniques to receive user inputs to control an under-display camera and/or under-display sensor and compensate for occlusions of the under-display camera and/or under-display sensor.

BACKGROUND

Some mobile devices include a front-facing camera that faces a user while the user holds the mobile device. The front-facing camera can be adjacent to a display screen of a mobile device. This allows the mobile device to use the front-facing camera and the adjacent display screen for videoconferencing, for example. Because mobile devices are generally small for portability, front-facing cameras are often positioned within a bezel around a display screen. Some mobile device include display screens with notches or cutouts within which the display cannot display anything, and within which the front-facing camera is positioned. Users can generally see where the front-facing camera is positioned when the front-facing camera is positioned in a bezel, notch, or cutout. However, bezels, notches, and cutouts take up valuable real estate on the front surface of a mobile device, and prevent a mobile device from having a display screen that occupies the full front surface of the mobile device.

SUMMARY

Systems and techniques are described herein for using an under-display camera and/or under-display sensor positioned underneath a display of a device (e.g., a mobile device or other device). The device can display an indicator indicating the position of the under-display camera and/or under-display sensor on the display. The device can compensate for occlusions of the under-display camera and/or under-display sensor. For example, such occlusions may be caused by a user or input device touching the display in a way that occludes the under-display camera and/or under-display sensor, a user or input device hovering over the display in a way that occludes the under-display camera and/or under-display sensor, or a user or input device otherwise being close enough to the display to occlude the under-display camera and/or under-display sensor. The device can control the under-display camera and/or under-display sensor based on the inputs. The device can include user interface (UI) elements that allow for selection of an area of an image without touching, hovering over, or otherwise covering the area of the image, for instance where such an input at the area of the image would occlude the under-display camera and/or under-display sensor.

In one example, an apparatus for image processing is provided. The apparatus includes a memory. The apparatus includes one or more processors coupled to the memory and configured to perform a method. The method includes receiving an image captured by a camera based on incident light received by the camera. The camera is positioned relative to a display to receive the incident light that passes through a portion of the display before reaching the camera. The method includes displaying, on the display, a display image that is based on the image. The method includes displaying an indicator overlaid over the display image at an indicator area of the display while the display is displaying the display image. The indicator area includes at least a subset of the portion of the display.

In another example, an apparatus for image processing is provided. The apparatus includes one or more memory units storing instructions. The apparatus includes one or more processors that execute the instructions, wherein execution of the instructions by the one or more processors causes the one or more processors to perform a method. The method includes receiving an image captured by a camera based on incident light received by the camera. The camera is positioned relative to a display to receive the incident light that passes through a portion of the display before reaching the camera. The method includes displaying, on the display, a display image that is based on the image. The method includes displaying an indicator overlaid over the display image at an indicator area of the display while the display is displaying the display image. The indicator area includes at least a subset of the portion of the display.

In another example, a method of image processing is provided. The method includes receiving image data captured by an image sensor. The method includes receiving an image captured by a camera based on incident light received by the camera. The camera is positioned relative to a display to receive the incident light that passes through a portion of the display before reaching the camera. The method includes displaying, on the display, a display image that is based on the image. The method includes displaying an indicator overlaid over the display image at an indicator area of the display while the display is displaying the display image. The indicator area includes at least a subset of the portion of the display.

In another example, an non-transitory computer readable storage medium having embodied thereon a program is provided. The program is executable by a processor to perform a method of image processing. The method includes receiving an image captured by a camera based on incident light received by the camera. The camera is positioned relative to a display to receive the incident light that passes through a portion of the display before reaching the camera. The method includes displaying, on the display, a display image that is based on the image. The method includes displaying an indicator overlaid over the display image at an indicator area of the display while the display is displaying the display image. The indicator area includes at least a subset of the portion of the display.

In another example, an apparatus for image processing is provided. The apparatus includes a memory. The apparatus includes means for receiving an image captured by a camera based on incident light received by the camera. The camera is positioned relative to a display to receive the incident light that passes through a portion of the display before reaching the camera. The apparatus includes means for displaying, on the display, a display image that is based on the image. The apparatus includes means for displaying an indicator overlaid over the display image at an indicator area of the display while the display is displaying the display image. The indicator area includes at least a subset of the portion of the display.

In another example, a method of image processing is provided. The method includes receiving an image captured by a camera. The camera is positioned underneath an area of a display and captures the image using light passing through the display. The method includes displaying the image on the display. The method includes setting an image processing property to a particular setting that is determined based on the area of the display. The image processing property is one of a white balance, a black level compensation, a gamma correction, a gain, a color correction, a color saturation, a noise filter, a contrast control, a brightness control, a tone mapping, a sharpness, a blurring, or a red eye correction.

In another example, a method of image processing is provided. The method includes receiving an image captured by a camera. The camera captures the image based on incident light received by the camera. The camera is positioned relative to a touchscreen display to receive the incident light that passes through a portion of the touchscreen display before reaching the camera. The method includes displaying, on the touchscreen, a display image based on the image. The method includes displaying an area selection user interface (UI) element on the touchscreen. The method includes receiving a touch input to the touchscreen display at an area selection input area that overlaps with the area selection UI element. The method includes selecting a selection area of the display image in response to receiving the touch input. The method includes setting a camera property of the camera to a setting that is determined based on the selection area of the display image in response to selection of the selection area, wherein the camera property of the camera includes at least one of an image capture property or an image processing property.

In some aspects, the indicator area of the display is at least as large as a lens of the camera. In some aspects, the indicator is at least as large as a lens of the camera.

In some aspects, the methods, apparatuses, and computer-readable medium described above further comprise: receiving an input, wherein the indicator is displayed overlaid over the indicator area in response to receipt of the input. In some aspects, the input includes at least one of a touch of a touch-sensitive touchscreen surface of the display, a predefined gesture across the touch-sensitive touchscreen surface of the display, a hover over the display, a predefined gesture over the display, a voice input reciting a predefined phrase recorded by a microphone.

In some aspects, the methods, apparatuses, and computer-readable medium described above further comprise: generating the display image by modifying a size of the image using at least one of scaling and cropping. In some aspects, modifying the size of the image includes modifying the size of the image such that the display image is displayed on the display other than on the indicator area.

In some aspects, the methods, apparatuses, and computer-readable medium described above further comprise: generating the display image by processing the image, wherein processing the image includes modifying at least one of a brightness, a contrast, a color saturation, a tone, a white balance, a black balance, a level, a gamma correction, a gain, a color correction, a noise filter, a sharpness, a blurring, and a red eye correction.

In some aspects, wherein the camera is positioned adjacent to the display along an axis that is perpendicular to a planar surface of the display. In some aspects, the indicator includes a shape around at least part of the portion of the display. In some aspects, displaying the indicator includes causing a plurality of pixels in an indicator area to display a color. In some aspects, the color is black. In some aspects, the indicator is animated.

In some aspects, displaying the indicator overlaid over the display image at the indicator area while the display is displaying the display image includes modifying the display image to merge the indicator with the display image. In some aspects, the display is a touchscreen.

In some aspects, the methods, apparatuses, and computer-readable medium described above further comprise: displaying an image capture user interface (UI) element over an image capture UI area on the display; receiving an input at the image capture UI area, wherein the input is one of a touch input, a hover input, and a gesture input; receiving a second image captured by the camera in response to receiving the input at the image capture UI area; and storing the second image to a non-transitory computer-readable storage medium.

In some aspects, the methods, apparatuses, and computer-readable medium described above further comprise: receiving an input at an area selection user interface (UI) area, wherein the input is one of a touch input, a hover input, and a gesture input; and selecting a selection area of the display image in response to receiving the input at the area selection UI area, wherein the area selection UI area is distinct from the selection area of the display image. In some aspects, the selection area of the display image includes at least a portion of the indicator area. In some aspects, the methods, apparatuses, and computer-readable medium described above further comprise: displaying an area selection UI element at the area selection UI area. In some aspects, the methods, apparatuses, and computer-readable medium described above further comprise: generating the area selection UI element to depict a copy of at least a portion of the selection area.

In some aspects, the methods, apparatuses, and computer-readable medium described above further comprise: setting an image capture parameter to a particular setting that is determined based on the selection area of the display image in response to selection of the selection area, wherein the image capture parameter includes at least one of a focus and an exposure parameter. In some aspects, the methods, apparatuses, and computer-readable medium described above further comprise: setting an image processing property to a particular setting that is determined based on the selection area of the display image in response to selection of the selection area, wherein the image processing property is one of a white balance, a black level compensation, a gamma correction, a gain, a color correction, a color saturation, a noise filter, a contrast control, a brightness control, a tone mapping, a sharpness, a blurring, and a red eye correction.

In some aspects, the methods, apparatuses, and computer-readable medium described above further comprise: receiving a second image captured by the camera after capture of the image; determining that the second image is occluded by an occlusion; and displaying the display image on the display in response to determining that the second image is occluded by the occlusion. In some aspects, the methods, apparatuses, and computer-readable medium described above further comprise: receiving an input, wherein the occlusion is associated with receipt of the input, wherein the input is one of a touch input, a hover input, and a gesture input; selecting a selection area of the display image based on the input; determining a setting based on the selection area of the display image; applying the setting; and receiving a third image captured by the camera while the setting is applied and after capture of the second image.

In some aspects, the methods, apparatuses, and computer-readable medium described above further comprise: receiving a second image captured by a second camera based on secondary incident light received by the second camera, wherein the second camera is positioned relative to the display to receive the secondary incident light that passes through a second portion of the display before reaching the second camera. In some aspects, the methods, apparatuses, and computer-readable medium described above further comprise: determining that the second image is occluded by an occlusion, wherein the display image is displayed in response to determining that the second image is occluded by the occlusion. In some aspects, the methods, apparatuses, and computer-readable medium described above further comprise: determining depth information corresponding to one or more objects depicted in the image and in the second image by processing the image and the second image.

In some aspects, the apparatus comprises a camera, a mobile device (e.g., a mobile telephone or so-called "smart phone" or other mobile device), a wireless communication device, a wearable device, an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications associated with processing of the image, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
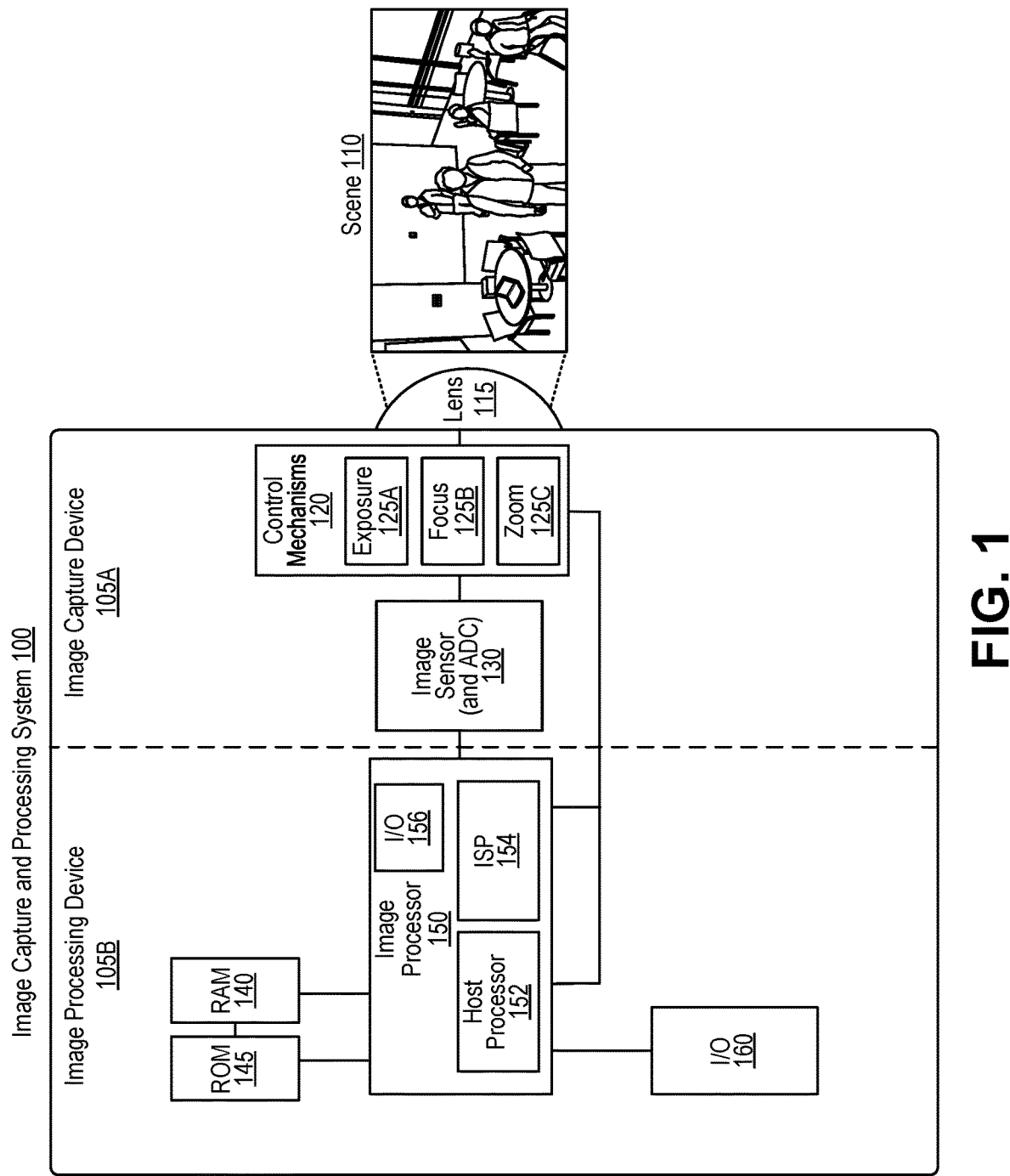
FIG. 1 is a block diagram illustrating an example of an architecture of an image capture and processing device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and directs the light toward an image sensor of the image capture device. The light received by the lens can pass through an aperture controlled by one or more control mechanisms. The light received by the lens is received by the image sensor after passing through the lens. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

As described in more detail below, systems and techniques are described herein for using one or more under-display cameras and/or one or more under-display sensors positioned underneath a display of a device (e.g., a mobile device or other device) . . . . Some image capture devices include one or more front-facing cameras on a front surface of the image capture device. In some examples, the one or more front-facing cameras face the same direction that a display screen of the image capture device faces. In videoconferencing as an illustrative example, the one or more front-facing cameras capture images (e.g., video frames) of a user while the display screen faces the user and displays images (e.g., video frames) of one or more other users connected to the videoconference and/or of the user himself/herself. A user can capture an image of himself or herself-referred to as a "selfie"-using the one or more front-facing cameras that face the user. The user can align the capture of the image to frame and align the user's depiction in the image by viewing a display image frames displayed on the display screen that faces the user while the user moves the image capture device into position for capturing the image. The display image frames may be based on image frames that are captured by the one or more front-facing cameras and/or stored temporarily in an image buffer, and may therefore act as a preview of the field(s) of view of the one or more front-facing cameras.

In some cases, the one or more front-facing cameras may be positioned adjacent to the display screen in a direction parallel to a planar surface of the display screen. For instance, the one or more front-facing cameras can be positioned in a bezel around the display screen. In some cases, a display screen can include a notch or a cutout within which the display screen does not display anything. A cutout can sometimes be referred to as a "hole" or a "hole punch" in the display screen. Each of the one or more front-facing cameras can be positioned within such a bezel, notch, or cutout. One benefit of placing a front-facing camera in a bezel, notch, or cutout is that the user understands where the front-facing camera is positioned on the front surface of the image capture device. The bezel, notch, or cutout can in some cases be one of the only positions on a front surface of the device that is not covered by a display screen. Presence of a bezel, notch, or cutout on a front surface of a device can be seen as an indicator that a front-facing camera is positioned within the bezel, notch, or cutout. However, the presence of bezels, notches, and/or cutouts in a device prevents a display screen from occupying a full surface of an image capture device. Such a side effect of bezels, notches, and/or cutouts can cause issues, especially on devices such as cellular phones that have small front surfaces. Use of smaller display screens can result in accessibility issues. For example, users with poor eyesight or vision problems can have difficulty seeing visual elements that are displayed on the display screen. If the display screen is a touchscreen, users with poor eyesight may have problems with seeing and successfully interacting with touch-based user interface elements displayed on the display screen. Positioning of cameras in bezels, notches, and/or cutouts can also cause gaze mismatch issues. Gaze mismatch refers to the user looking at the display rather than the camera during capture of an image of the user by the camera. This causes the user to be depicted with their eyes looking off to the side in the captured image. This is frequently a problem in videoconferencing, as the user generally looks at the display to see the second user that the user is speaking with, and in doing so, is not looking at the camera. Thus, neither user appears to be making eye contact with the other during the videoconference.

A device may include a camera positioned underneath a display screen. Such a camera can be referred to as an under-display camera. An under-display camera can capture images using light that passes through the display screen underneath which the under-display camera is positioned. In some examples, the under-display camera can capture an image using light that passes through the display screen while the display screen is in use and displaying visual content. In some examples, the under-display camera can capture an image using light that passes through the display screen while the display screen is turned off and not displaying any visual content. In some examples, the under-display camera can capture an image using light that passes through the display screen during brief periods in which the display screen flickers off while the display screen is otherwise turned on and displaying visual content.

A device with one or more under-display cameras can include a display screen that faces the same direction as the one or more under-display cameras and that occupies a full front surface of the device without any bezels, notches, or cutouts. However, devices with under-display cameras can have issues. For instance, if the camera is underneath the display screen, a user may not know where the camera is located. In one example, a user wishing to look at the front-facing camera while an image is being captured, as is often the case for selfie images or group images, may not know where on the device to look. A user interacting with the touchscreen while the under-display camera is active may also obscure the camera with the user's finger or stylus by touching a portion of the touchscreen that is positioned over the under-display camera. For example, a device can include a touchscreen user interface that allows a user to touch an area of an image to select that area of the image. In some cases, a user may accidentally end up occluding the camera while touching the display to try to select an area of the image.

The issues with under-display cameras are not limited to front-facing displays and/or front-facing cameras. Some devices may have multiple displays and/or multiple under-display cameras on different surfaces. For example, some devices may have a front surface and a rear surface, and may have displays with under-display cameras on the front surface and the rear surface. Some devices may have folding displays, or may have a fold or hinge between two separate displays. Those displays, and the under-display cameras underneath each of them, may face different directions at different times. Some under-display cameras may be occluded and disabled by the device when a foldable device is folded closed.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 directs the light toward the image sensor 130. The light received by the lens 115 passes through an aperture controlled by one or more control mechanisms 120 and is received by an image sensor 130.

The one or more control mechanisms 120 may control exposure, focus, white balance, black balance, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130. Each of the microlenses can direct the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1020, read-only memory (ROM) 145/1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The I/O 156 and/or I/O 160 may include connections to a display. The connections to the display included in the I/O 156 and/or I/O 160 can include output connections by which the image processor 150 transfers an image captured by the image sensor 130 and processed using the image processor 150 to the display and/or to a display controller. The display controller receives the image and causes the display to display the image.

In some implementations, the display can be a touchscreen. The connections to the display included in the I/O 156 and/or I/O 160 can include input connections, through which the image processor 150 can receive inputs from the touchscreen and/or a touchscreen controller. For instance, the touchscreen can receive a touch input, and the touchscreen controller can transmit information about the touch input to the image processor 150. The touch input may be an instance in which a portion of the touchscreen detects a touch by a user's finger, by a stylus, by a pointer, by a pen, by a pencil, or by another input device. The information about the touch input can include, for example, coordinates of the touch input on the touchscreen. The touch input can be received at the touchscreen while the touchscreen is displaying an image. The information about the touch input can identify a portion of an image that is being displayed on the touchscreen at the portion of the touchscreen that received the touch input. The portion of the image can include, for example, an area spanning one or more pixels of the image. The touch input can be received at the touchscreen while the touchscreen is displaying a user interface (UI). The UI can include one or more UI elements, such as virtual buttons or sliders. The information about the touch input can identify a portion of the UI (e.g., a UI element) that was displayed on the touchscreen at the portion of the touchscreen that received the touch input. The touchscreen can be a resistive touchscreen, a capacitive touchscreen, a surface acoustic wave (SAW) touchscreen, an infrared (IR) touchscreen, an optical imaging touchscreen, a dispersive signal touchscreen, a piezoelectric touchscreen, an acoustic pulse recognition touchscreen, another type of touchscreen discussed herein, or some combination thereof.

In some implementations, the display may include one or more other input components. For example, the display may include one or more active depth sensors next to or underneath the display. The active depth sensors may face the same direction as the display. The active depth sensors may include stereo cameras. The active depth sensors may be any type of sensors discussed herein with respect to the sensor 260. The connections to the display included in the I/O 156 and/or I/O 160 can include input connections, through which the image processor 150 can receive inputs from the active depth sensors. Inputs from the active depth sensors may be processed by the image processor 150 or another processor to determine distance from the sensors to an object, which may be referred to as depth. If the active depth sensors include cameras, this depth determination may be performed using stereoscopic image processing as discussed further herein. A device with the active depth sensors may thus determine three-dimensional coordinates of objects in the environment around the device. The image processor 150 (or another processor) may process the sensor measurements from the active depth sensors to determine whether a user's hand, finger, or pointing device (e.g., stylus) is hovering over, pointing at, gesturing toward, or gesturing around a user interface (UI) element displayed on the display. If the image processor 150 (or another processor) detects that the user (or pointing device) is hovering over, pointing at, gesturing toward, or gesturing around a particular UI element, the image capture and processing system 100 may trigger a function corresponding to that UI element. Hover-based, pointing-based, or gesture-based interaction with a display may be more hygienic than touchscreen-based interaction with the display, especially for image capture and processing systems 100 that many different people are expected to interact with. For instance, these non-touch inputs may be more hygienic for image capture and processing systems 100 that are included in point of sale (POS) terminals, automated teller machines (ATM), restaurant ordering kiosks, information kiosks, or other kiosks.

At least a subset of the image capture and processing system 100 can positioned underneath the display. In some examples, at least the image sensor 130 and the lens 115 are positioned under the display. In one example, the image capture device 105A is positioned under the display. In some examples, the image processing device 105B is positioned under the display. The term "under-display camera" may refer to at least a subset of an image capture and processing system 100 that is at least partially positioned underneath a display, at least a subset of an image capture device 105A that is at least partially positioned underneath a display, at least a subset of an image processing device 105B that is at least partially positioned underneath a display, or some combination thereof. A component or device that is positioned underneath a display may be referred to as an under-display component or device.

Figure 2A:
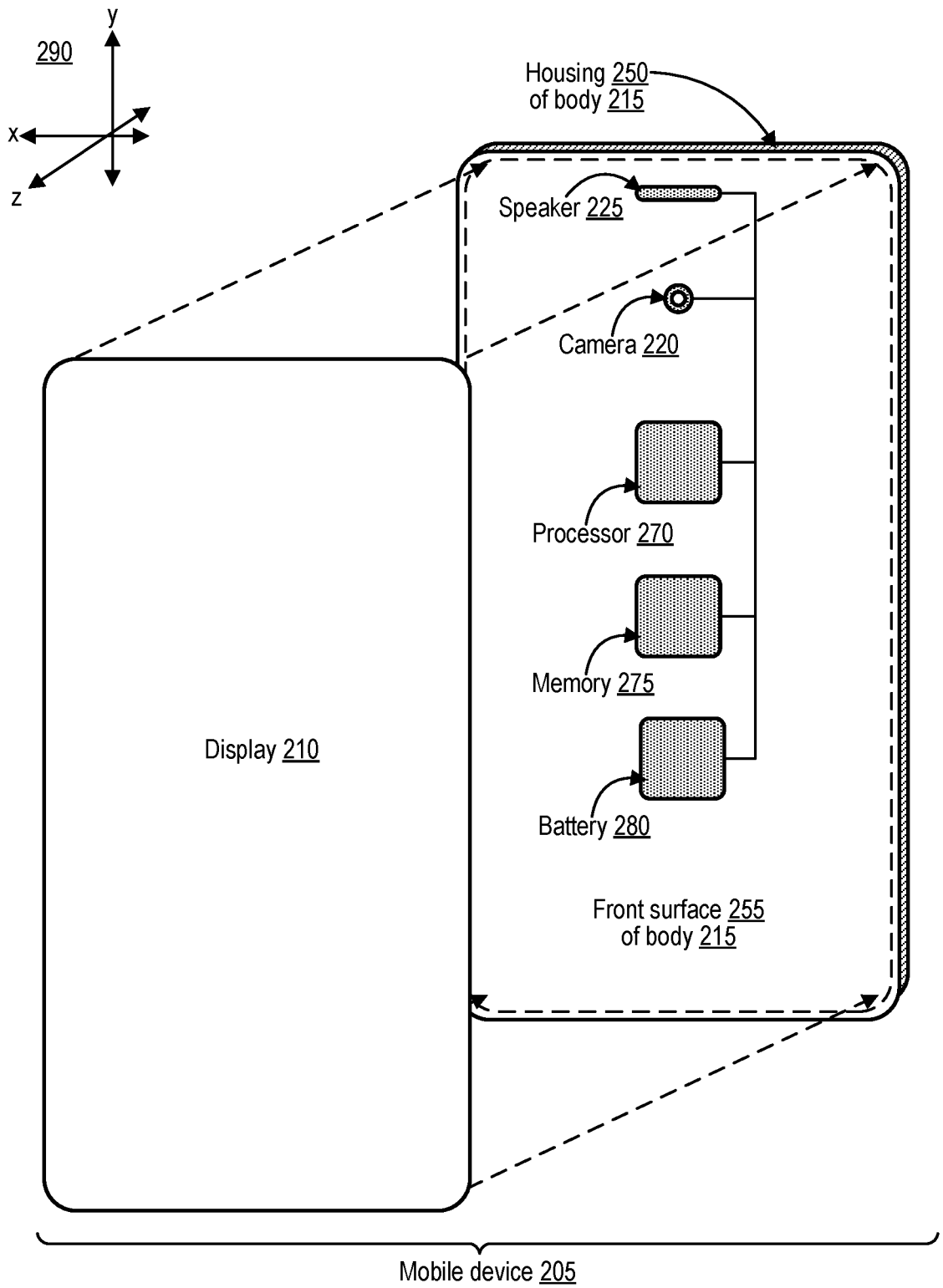
FIG. 2A is an exploded front view of a mobile device with a display, an under-display camera, and an under-display speaker.

FIG. 2A is an exploded front view of a mobile device 205 with a display 210, an under-display camera 220, and an under-display speaker 225. A legend 290 is included in FIG. 2A that displays three axes representing different spatial dimensions in FIG. 2A. These axes are identified as the X axis, the Y axis, and the Z axis. The X axis and the Y axis are parallel to the planar surface of the display 210. The Z axis is perpendicular to the planar surface of the display 210. The mobile device 205 is illustrated with a body 215 that includes a front surface 255, which is white in FIG. 2A. The body 215 also includes a housing 250, which is shaded using diagonal stripes in FIG. 2A. As indicated by dashed lines and dashed arrows, the display 210 is in front of the front surface 255 of the body 215 along the Z axis, and is to be placed onto the front surface 255 of the body 215. The front surface 255 of the body 215 includes a camera 220 and a speaker 225. Placing the display 210 onto the front surface of the body 215 includes placing the display 210 onto and/or onto the camera 220 and the speaker 225 along the Z axis. Placing the display 210 onto the front surface of the body 215 covers the camera 220 and the speaker 225 with the surface of the display 210 along the Z axis.

The body 215 also includes a processor 270, a memory 275, and a battery 280. The camera 220 and speaker 225 are connected to the processor 270 and to the memory 275 via one or more data connection lines. In some cases, the processor 270 can include the image processor 150, the ISP 154, the host processor 152, or some combination thereof. The processor 270 can process image data captured by the image sensor of the camera 220. The memory 275 can store images captured by the camera 220 and/or processed by the processor 270. The memory 275 can also store audio to be output by the speaker 225. The processor 270 can process audio to be output by the speaker 225. The camera 220, the speaker 225, the processor 270 and or/the memory 275 receive power from the battery 280 over one or more data lines.

The camera 220 can be any type of camera discussed herein. For instance, the camera 220 may include at least a subset of an image capture device 105A, at least a subset of an image processing device 105B, at least a subset of an image capture and processing system 100, at least a subset of any other camera device or system discussed herein, or a combination thereof. The camera 220 can use any type of lens. For instance, the camera can use a normal lens, a wide-angle lens, a fisheye lens, a long-focus lens, a telephoto lens, a zoom lens, or a combination thereof. The camera 220 can detects light within a particular spectrum of light. The spectrum of light may be a subset of the electromagnetic spectrum. For example, the spectrum of light may be, or may include, the visible light (VL) spectrum, the infrared (IR) light spectrum, the near infrared (NIR) light spectrum, the ultraviolet (UV) light spectrum, another subset of the electromagnetic spectrum, or a combination thereof. The NIR light spectrum may refer to a subset of the IR light spectrum that is adjacent to the VL spectrum. The image sensor of the camera 220 may be a complementary metal-oxide-semiconductor (CMOS) image sensor, a charge-coupled device (CCD) image sensor, another type of image sensor, or a combination thereof. The image sensor of the camera 220 may be any size of image sensor.

Figure 2B:
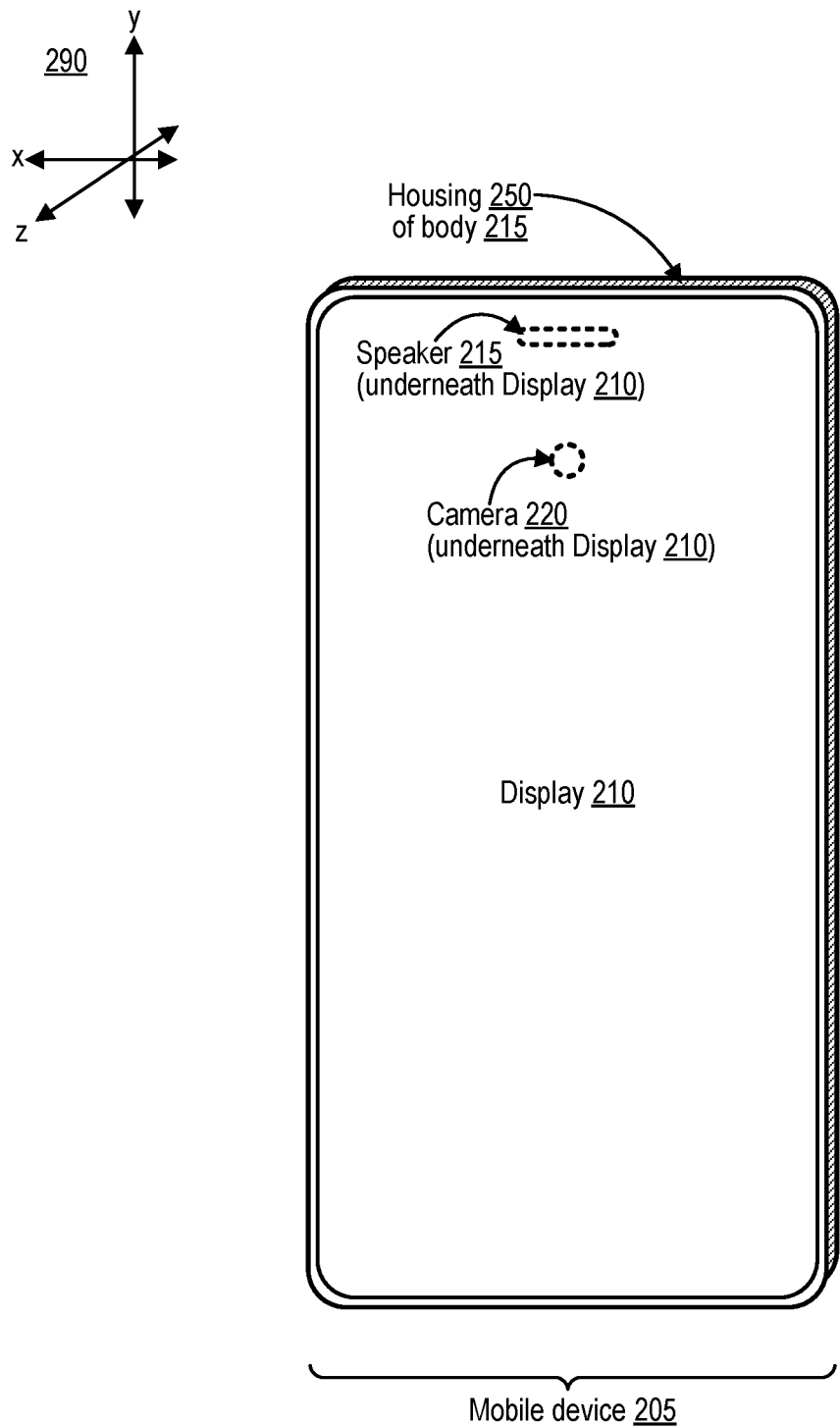
FIG. 2B is a non-exploded front view of the mobile device of FIG. 2A.

FIG. 2B is a non-exploded front view of the mobile device 205 of FIG. 2A. The camera 220 is positioned underneath the display 210 and is covered by the display 210 in FIG. 2B. The legend 290 of FIG. 2A is also included in FIG. 2B. The camera 220 may be referred to as an under-display camera. The speaker 225 is positioned underneath the display 210 along the Z axis, and is covered by the display 210 in FIG. 2B. The speaker 225 may be referred to as an under-display speaker. The speaker 225 is positioned near the top of the mobile device 205 along the Y axis, and may output audio toward the display 210, so that the audio waves travel through the display 210. A user holding the mobile device 205 adjacent to his or her ear can hear the audio output by the speaker 225 through the display 210. The speaker 225 and the camera 220 may be adjacent to the display 210 along the Z axis. Because the camera 220 is entirely covered by the display 210, any incident light that reaches the camera 220 passes through a light-passing area 285 of the display 210 before reaching the camera 220. The light-passing area 285 is illustrated using dashed lines, and at least as large as the lens of the camera 220. In some devices, a camera may be only partly covered by a display 210, in which case some of the incident light that reaches such a camera may pass through the area 285 of the display 210, while other incident light that reaches such a camera may pass through another display, a non-display surface, or no surface at all (e.g., air or another fluid). In some cases, the light-passing area 285 of the display 210 may simply be referred to as a portion of the display 210, or as an area of the display 210.

For simplicity, the processor 270, memory 275, and the battery 280 are not illustrated in FIG. 2B. Likewise, the data and power lines between the camera 220, the speaker 225, the processor 270, the memory 275, and the battery 280 are not illustrated in FIG. 2B. It should be understood that these components can still be present in the mobile device 205 of FIG. 2B in a similar configuration to the configuration illustrated in FIG. 2A, positioned underneath the display 210 along the Z axis.

The display 210 is illustrated as being slightly smaller than the front surface 255 of the body 215 of the mobile device 205 so that the display 210 is clearly visible within FIG. 2A and FIG. 2B as a distinct component of the mobile device 205. The mobile device 205 thus includes a small bezel around the display 210. However, this bezel need not be present in the mobile device 205. In some cases, the display 210 can cover the full vertical length and/or the full horizontal length of the front surface 255 of the body 215 of the mobile device 205, from edge to edge, with no bezel around the display 210. In some cases, the display 210 can include one or more portions that curve around an edge of the front surface 255 of the body 215 of the mobile device 205, so that the display 210 may even wrap around to at least a portion of the sides of the mobile device 210 that connect the front surface 255 of the body 215 to the rear surface 240 of the body 215 of the mobile device 205.

Figure 2C:
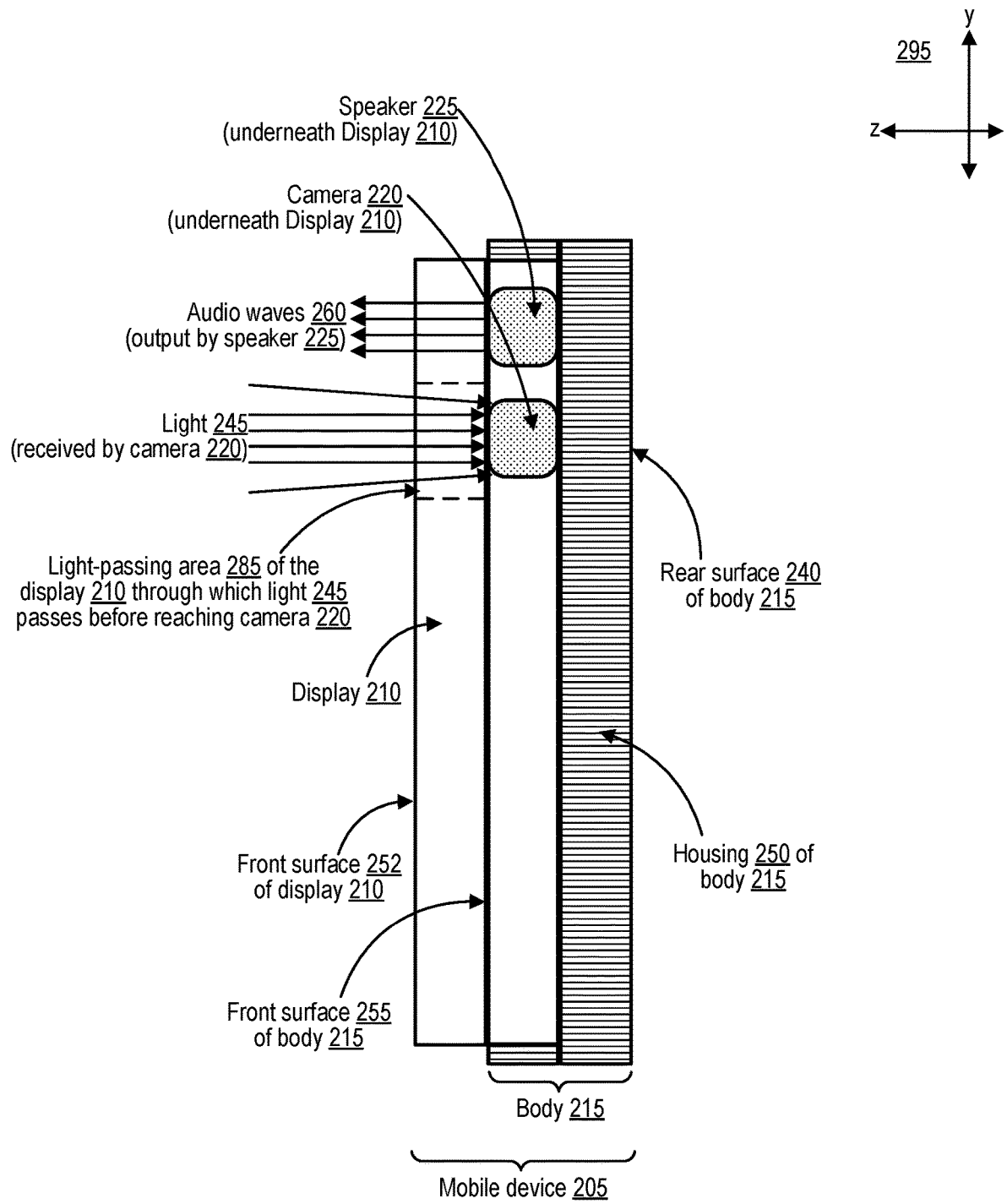
FIG. 2C is a cutaway side view of the mobile device of FIG. 2A.

FIG. 2C is a cutaway side view of the mobile device 205 of FIG. 2A. A legend 295 showing only the Y axis and the Z axis of the legend 290 is included in FIG. 2C due to the change in perspective from FIG. 2A and FIG. 2B to FIG. 2C. In the side view of the mobile device 205 of FIG. 2C, the front surface 252 of the display 210 appears on the left side of the mobile device 205, while the rear surface 240 of the body 215 appears on the right side of the mobile device 205. The body 215 includes a housing 250 that is illustrated as a region shaded with horizontal stripes. The body 215 also includes the camera 220 and the speaker 225. A portion of the body 215 may be coupled to the camera 220 and/or to the speaker 225. The front portions of the camera 220 and the speaker 225 form parts of the front surface 255 of the body 215. The camera 220 and the speaker 225 are illustrated as adjacent to the display 210 and/or coupled to the display 210 along the Z axis. In some cases, there may be some space along the Z axis between the camera 220 and the display 210, and/or between the speaker 225 and the display 210.

Several rays of light 245 are illustrated as arrows passing through the display 210 and reaching the camera 220. An image sensor 130 of the camera 220 receives the light 245 that passes through at least a portion of the display 210. In some examples, the display 210 may include microlenses in interstitial regions between the pixels of the display. The display 210 may be a touchscreen. In some aspects, the interstitial regions, and therefore the microlenses, are also positioned between traces of a touch-sensitive touchscreen surface of the display 210. These traces may be capacitive traces, resistive traces, or other traces, depending on the type of touchscreen. In some examples, the light 245 passes through transparent and/or translucent layers of liquid crystal, glass, and/or plastic of the display 210 before reaching the under-display camera. In some cases, the cameras 220 and/or associated processor 270 can perform image processing to compensate for color biasing from color associated with the materials of the display 210 that the light 245 passes through before reaching the camera 220, such as color filters. The light 245 received by the image sensor 130 of the camera 220 may be incident light that passes through at least a portion of the display 210 before reaching the camera 220 (e.g., before impinging an image sensor 130 of the camera 220).

Several audio waves 260 are illustrated as arrows passing through the display 210. The audio waves 260 continue past the front surface 252 of the display 210 and propagate into the air. The audio waves 260 can be heard by a user when adjacent to or within a range of the mobile device 205.

For simplicity, the processor 270, memory 275, and the battery 280 are not illustrated in FIG. 2C. Likewise, the data and power lines between the camera 220, the speaker 225, the processor 270, the memory 275, and the battery 280 are not illustrated in FIG. 2C. It should be understood that these components can still be present in the mobile device 205 of FIG. 2C in a similar configuration to the configuration illustrated in FIG. 2A.

Figure 2D:
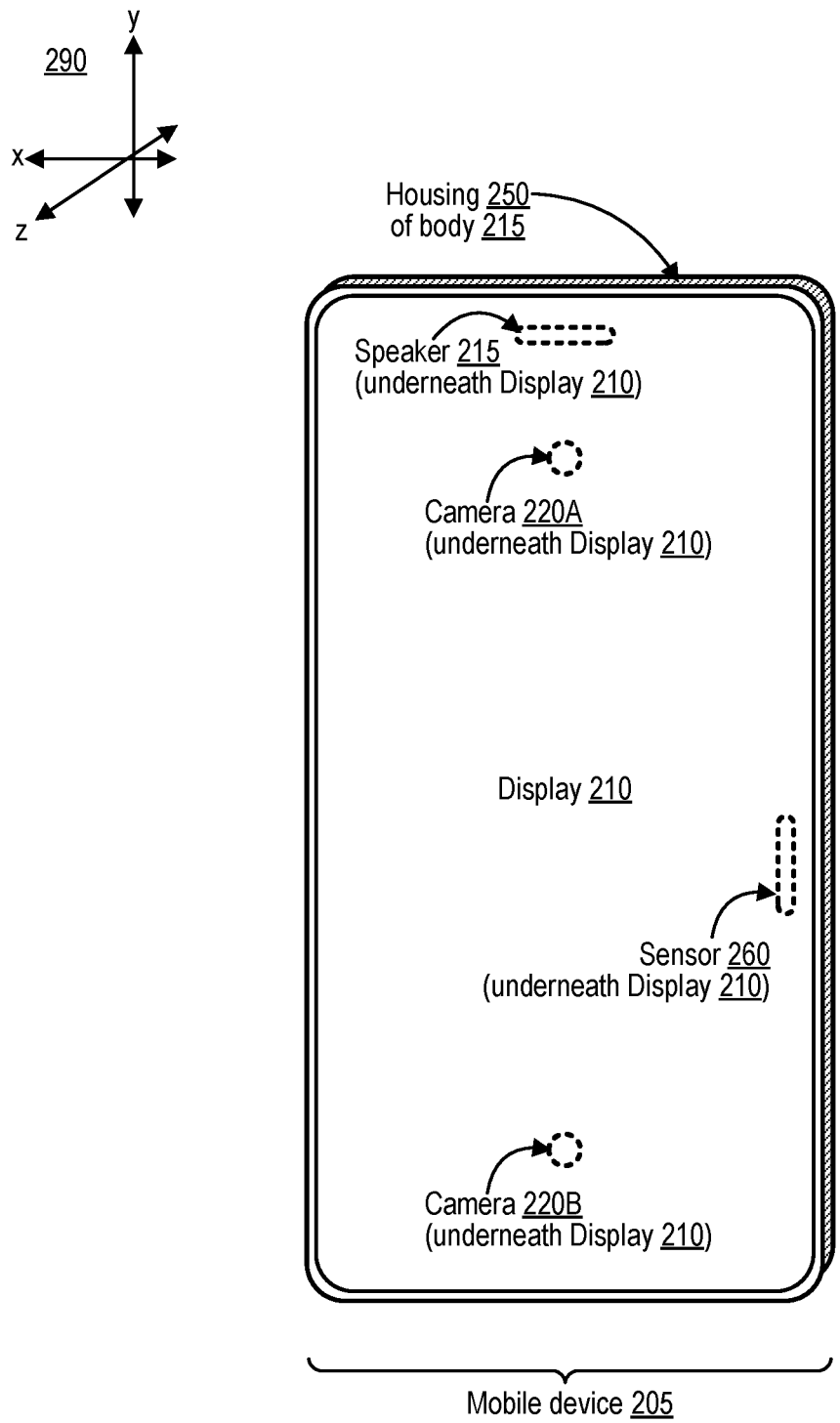
FIG. 2D is a front view of the mobile device of FIG. 2A with a first under-display camera, a second under-display camera, and an under-display sensor.

FIG. 2D is a front view of the mobile device 205 of FIG. 2A with a first under-display camera 220A, a second under-display camera 220B, and an under-display sensor 260. The first under-display camera 220A and the second under-display camera 220B may be referred to as the first camera 220A and the second camera 220B, respectively. The under-display sensor 260 may be referred to as the sensor 260. The legend 290 of FIG. 2A is also included in FIG. 2D. The mobile device 205 is an example of a device with multiple under-display cameras. Like the camera 220 of FIGS. 2A-2C, the first camera 220A and the second camera 220B are positioned underneath the display 210 along the Z axis. In the context of FIG. 2C, the first camera 220A and the second camera 220B may be positioned between the display 210 and the housing 250 of the body 215 of the mobile device 205, similarly to the camera 220 and the speaker 225 of FIG. 2C. The first camera 220A can receive incident light that passes through at least a first portion of the display 210 before reaching the first camera 220A. The second camera 220B can receive incident light that passes through at least a second portion of the display 210 before reaching the second camera 220B. Incident light reaching a camera can include the incident light impinging the image sensor of the camera. The first camera 220A and the second camera 220B can capture images based on receipt of this incident light at their respective image sensors. The first camera 220A is closer to a first side of the mobile device 205, while the second camera 220B is closer to a second side of the mobile device 205. In the example mobile device 205 illustrated in FIG. 2D, the first side is the top of the mobile device 205, while the second side is the bottom of the bottom of the mobile device. In other examples, the first side and/or the second side may be the left side or the right side.

Because the first camera 220A and the second camera 220B are positioned a distance apart, the first camera 220A and the second camera 220B can be used as stereoscopic cameras. The first camera 220A can capture a first image and the second camera 220B can capture a second image within the same time window. The time window may be a predetermined duration of time, such as one or more picoseconds, one or more nanoseconds, one or more milliseconds, one or more seconds, or a combination thereof. The mobile device 205, or another device that receives the first image and the second image from the mobile device 205, can process the first image and the second image using stereoscopic image processing to determine depth information corresponding to the first image and the second image. Depth information can refer to a depth of different objects depicted in the first image and in the second image. Depth can refer to a distance between a photographed object and the mobile device 205. The greater the distance between the photographed object and the mobile device 205, the greater the depth of the object. The lower the distance between the photographed object and the mobile device 205, the lower the depth of the object. Stereoscopic image processing may also be referred to as stereo image processing, multi image processing, binocular image processing, stereoscopic camera processing, stereo camera processing, multi camera processing, binocular camera processing, or a combination thereof.

Stereoscopic image processing can use stereo disparity, binocular disparity, stereopsis, stereo triangulation, triangulation, stereophotogrammetry, photogrammetry, three-dimensional (3D) mapping, 3D modeling, or a combination thereof to determine depth information corresponding to at least a subset of pixels of the first image and/or to at least a subset of pixels of the second image. In some examples, stereoscopic image processing can include detecting a first depiction of a feature (e.g., a corner or edge) in the first image, and detecting a second depiction of the same feature in the second image. Stereoscopic image processing can determine a depth of the feature by determining a distance between a position of the first depiction of the feature in the first image and a position of the second depiction of the feature in the second image. This distance can be referred to as a stereo disparity, stereoscopic disparity, or binocular disparity. The greater the stereo disparity, the lower the depth of the feature, and the closer the feature is to the mobile device 205. The lower the stereo disparity, the higher the depth of the feature, and the farther the feature is from the mobile device 205.

Figure 3A:
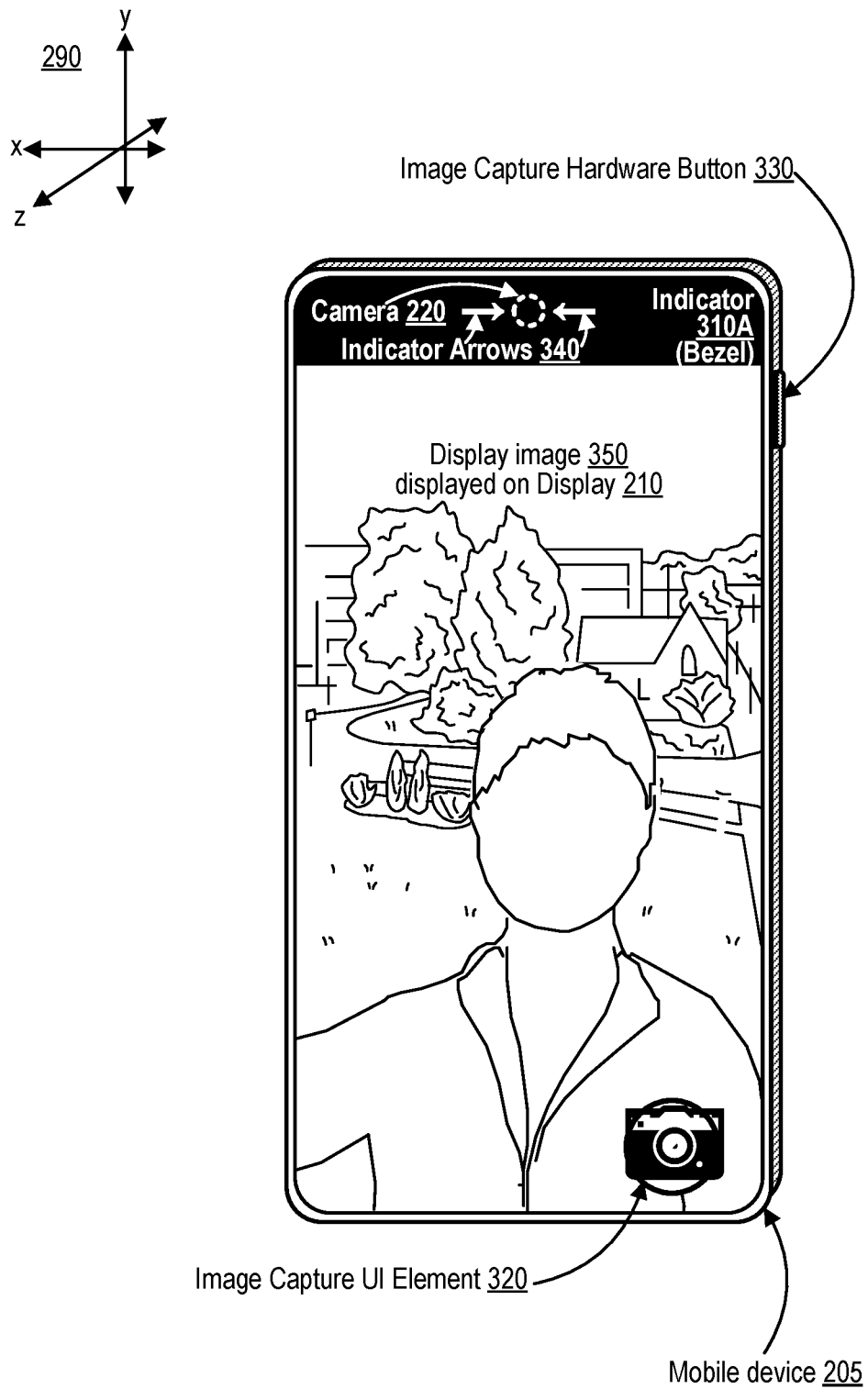
FIG. 3A is a front view of a mobile device with an under-display camera in which the display displays a black bezel-style indicator over the camera.

For example, the first image and the second image may both depict a person in front of a background, similarly to the display image 350 displayed on the display 210 of FIG. 3A. The mobile device 205 can process the first image and the second image using stereoscopic image processing to identify that the pixels depicting the person correspond to a low depth value because the person is close to the mobile device 205. The mobile device 205 can process the first image and the second image using stereoscopic image processing to identify that the pixels depicting the background correspond to a high depth value because the background is far from the mobile device 205.

The mobile device 205 may include more than two under-display cameras under the display 210. For instance, the mobile device 205 may include three under-display cameras, four under-display cameras, five under-display cameras, six under-display cameras, seven under-display cameras, eight under-display cameras, nine under-display cameras, ten under-display cameras, or more than ten under-display cameras. A mobile device 205 with N under-display cameras under the display 210 can capture at least N images of a scene within the same time window. Each of the N images of the scene can be captured with a different one of the N under-display cameras under the display 210. All N images can be processed using stereoscopic image processing, or multi image processing, to determine depth information for pixels and/or features depicted in at least a subset of the N images. If N is greater than two, the depth information determined can be even more accurate and detailed than if N is two.

In some examples, the first camera 220A and the second camera 220B share at least one component, type of component, feature, functionality, or a combination thereof. For example, the first camera 220A can use the same type of lens as the second camera 220B, the first camera 220A can detect light within the same spectrum of light as the second camera 220B, the first camera 220A can use the same type of image sensor as the second camera 220B, the first camera 220A can use the same dimensions of image sensor as the second camera 220B, or a combination thereof.

In some examples, the first camera 220A differs from the second camera 220B through the use of at least one different component, type of component, feature, functionality, or a combination thereof. For example, the first camera 220A can use a first lens, while the second camera 220B uses a second lens. The first lens may have a wider angle than the second lens, for instance if the first lens is a wide-angle lens or a fisheye lens. The wider angle of the first lens may grant the first camera 220A a wider field of view than the second camera 220B. The first lens may be a telephoto lens, while the second lens is not a telephoto lens, providing the first camera 220A with a longer focus than the second camera 220B. The first lens may be a zoom lens, while the second lens is not a zoom lens, providing the first camera 220A with a larger zoom than the second camera 220B. In some examples, the image sensor of the first camera 220A detects light within a first spectrum of light, while the image sensor of the second camera 220B detects light within a second spectrum of light. Each spectrum of light may refer to a different subset of the full electromagnetic spectrum. For example, the first spectrum of light can be the visible light (VL) spectrum, while the second spectrum of light can be the infrared (IR) light spectrum. The second spectrum of light may be the near infrared (NIR) light spectrum, which is a subset of the IR light spectrum adjacent to the VL light spectrum. The second spectrum of light may be the ultraviolet (UV) light spectrum. In some examples, the first image sensor of the first camera 220A can be a different type of image sensor than the second image sensor of the second camera 220B. For example, the first image sensor may be a complementary metal-oxide-semiconductor (CMOS) image sensor, while the second image sensor is a charge-coupled device (CCD) image sensor. The dimensions of the first image sensor may be different from the dimensions of the second image sensor, so that one is larger than the other. The first camera 220A and the second camera 220B can differ in any combination of the ways discussed herein.

The sensor 260 can be any type of sensor. For example, the sensor 260 can include at least one of a radio detection and ranging (RADAR) sensor, a light detection and ranging (LIDAR) sensor, an electromagnetic detection and ranging (EMDAR) sensor, a multispectral imaging detection and active reflectance (MIDAR) sensor, a sound detection and ranging (SODAR) sensor, a sound navigation and ranging (SONAR) sensor, a laser rangefinder, a time-of-flight (TOF) emitter/sensor, a structured light emitter/sensor, a camera with a coded aperture, an active depth sensor, a range sensor, a microphone, an accelerometer, a gyroscope, a global navigation satellite system (GNSS) receiver, a global positioning system (GPS) receiver, another sensor discussed herein, or a combination thereof. Like the camera 220 of FIGS. 2A-2C, the sensor 260 is positioned underneath the display 210. In the context of FIG. 2C, the sensor 260 may be positioned between the display 210 and the housing 250 of the body 215 of the mobile device 205, similarly to the camera 220 and the speaker 225 of FIG. 2C. The sensor 260 can receive incident light, sound, radio waves, microwaves, IR waves (e.g., NIR waves), UV waves, electromagnetic (EM) radiation, and/or other signals that pass through at least a portion of the display 210 before impinging the sensor 260. In some cases, sensor 260 can output light, sound, electromagnetic (EM) radiation, and/or other signals that pass through at least a portion of the display 210 and toward the environment after being output by the sensor 260. In some cases, the signals output by the sensor 260 can reflect off of objects in the environment, bounce back toward the sensor 260, and be received by the sensor 260.

FIG. 3A is a front view of a mobile device 205 with an under-display camera 220 in which the display 210 displays a black bezel-style indicator 310A in an indicator area. The term "indicator area" may refer to an area within which an indicator (such as the black bezel-style indicator 310A or another indicator) is displayed. An indicator area may include at least a subset of the light-passing area 290 over the camera 220. The legend 290 of FIG. 2A is also included in FIG. 3A. The camera 220 of the mobile device 205 captures one or more images. In some examples, the camera 220 can capture images continually, and may temporarily store those images in an image buffer. The mobile device 205 is illustrated displaying a display image 350 on the display 210. In some examples, the display image 350 is one of the images captured by the camera 220 and/or stored in the image buffer on the display 210. In some examples, the display image 350 is based on one of the images captured by the camera 220 and/or stored in the image buffer on the display 210. In some examples, the display image 350 is a modified variant of one of the images captured by the camera 220 and/or stored in the image buffer on the display 210. For example, the mobile device 205 may generate the display image 350 by modifying an image captured by the camera 220 using cropping, upscaling, downscaling, stretching, skewing, distorting, warping, adjusting brightness, adjusting contrast, adjusting color saturation, adjusting tone mapping, adjusting white balance, adjusting black balance, adjusting a histogram, adjusting levels, correcting red eye, overlaying text, overlaying user interface element(s), overlaying graphics, overlaying another image, overlaying element(s) of another image, merging the image with another image (e.g., to generate a HDR image), any other image processing image modification discussed herein, or a combination thereof. In one example, the display image 350 may be a version of an image captured by the camera 220 that is scaled so that a majority of the image is visible on the display 210 based on the resolution of the display 210, that is cropped to fit the dimensions of the display 210, and whose brightness and contrast and saturation are adjusted to display well on the display 210. The display image 350 can be used as a preview image previewing the camera 220's field of view by previewing a display image 350 that is based on an image that the camera 220 recently captured (e.g., an image that the camera 220 most recently captured). The display image 350 displayed on the display 210 in FIG. 3A is illustrated as a selfie image of a user in front of a background. The background includes buildings, trees, grass, and other foliage.

Because the camera 220 is underneath the display 210, a user of the mobile device 205 may not know where the camera 220 is located with respect to the front surface 255 of the display 210. A user wishing to look at the camera while an image is being captured—for example during capture of the selfie image displayed on the display 210 as the display image 350 in FIG. 3A—may not know where to look. To resolve this issue, the mobile device 205 of FIG. 3A displays a bezel-shaped indicator 310A overlaid over the display image 350 within the indicator area of the display 210. The bezel-shaped indicator 310 has a rounded rectangular shape outlining an area of the image where the camera 220 is positioned under the display 210 along the z-axis while the display image 350 is displayed on the display 210. The indicator 310 is illustrated as an area that is shaded in black. The mobile device 205 displays the indicator 310A by causing a plurality of pixels that are grouped together in the indicator area to display black. Depending on the type of display 210, the display 210 can instruct pixels to display black by turning off power to those pixels. A user of the mobile device 205 wanting to look at the camera 220 knows to look in the indicator area within which the bezel-style indicator 310A is displayed. The rounded rectangular shape of the indicator 310A of FIG. 3A mimics a bezel. Because the pixels of the display 210 display black in the indicator 310A, any interference on the light 245 reaching the camera 220 after passing through the display 210 is minimized.

The indicator 310A is large enough that a user might not understand which part of the indicator 310A rests atop the camera 220 along the Z axis. To help the user identify the position of the camera 220, the indicator area may include additional indicators identifying the position of the camera 220 underneath the display 210 may be overlaid atop the indicator 310A on the display 210. For example, two indicator arrows 340 that point toward the camera 220 are illustrated as being displayed overlaid atop the bezel-style indicator 310A in the indicator area on the display 210 in FIG. 3A. The indicator arrows may be displayed in a different color than the rest of the indicator area 310. Other types of additional indicators may be overlaid atop the indicator 310A or otherwise within the indicator area on the display 210, such as an indicator shape. The indicator shape may outline a smaller area than the indicator 310A within the indicator area. For example, the indicator shape may outline the position of the camera 220 positioned underneath the smaller area along the Z-axis. Examples of indicator shapes include the indicator 410 of FIG. 4 and the indicator 510 of FIG. 5.

The mobile device 205 includes an image capture hardware button 330. The mobile device 205 may receive an image capture input when the image capture hardware button 330 is pressed. In some cases, the image capture hardware button 330 can be replaced and/or supplemented with another hardware user interface that receives the image capture input, such as a switch, a touch-sensitive surface separate from the display 210, a fingerprint sensor, another type of biometric scanner, a microphone, a wheel, a knob, a slider, an accelerometer, a gyroscope, or some combination thereof. The mobile device 205 also includes an image capture user interface (UI) element 320 that is displayed on a UI area of the display 210, overlaid over the display image 350. The mobile device 205 may receive an image capture input when the touch-sensitive touchscreen surface of the display 210 receives a touch area at the UI area of the display 210.

In some examples, receipt of the image capture input trigger the camera 220 of the mobile device 205 to capture a second image, and for the mobile device 205 to receive and store the second image from the camera 220. In some examples, receipt of the image capture input triggers transfer of an image that was already captured by the camera 220 of the mobile device 205 from temporary storage in an image buffer to long-term non-temporary storage in a memory 175.

Figure 3B:
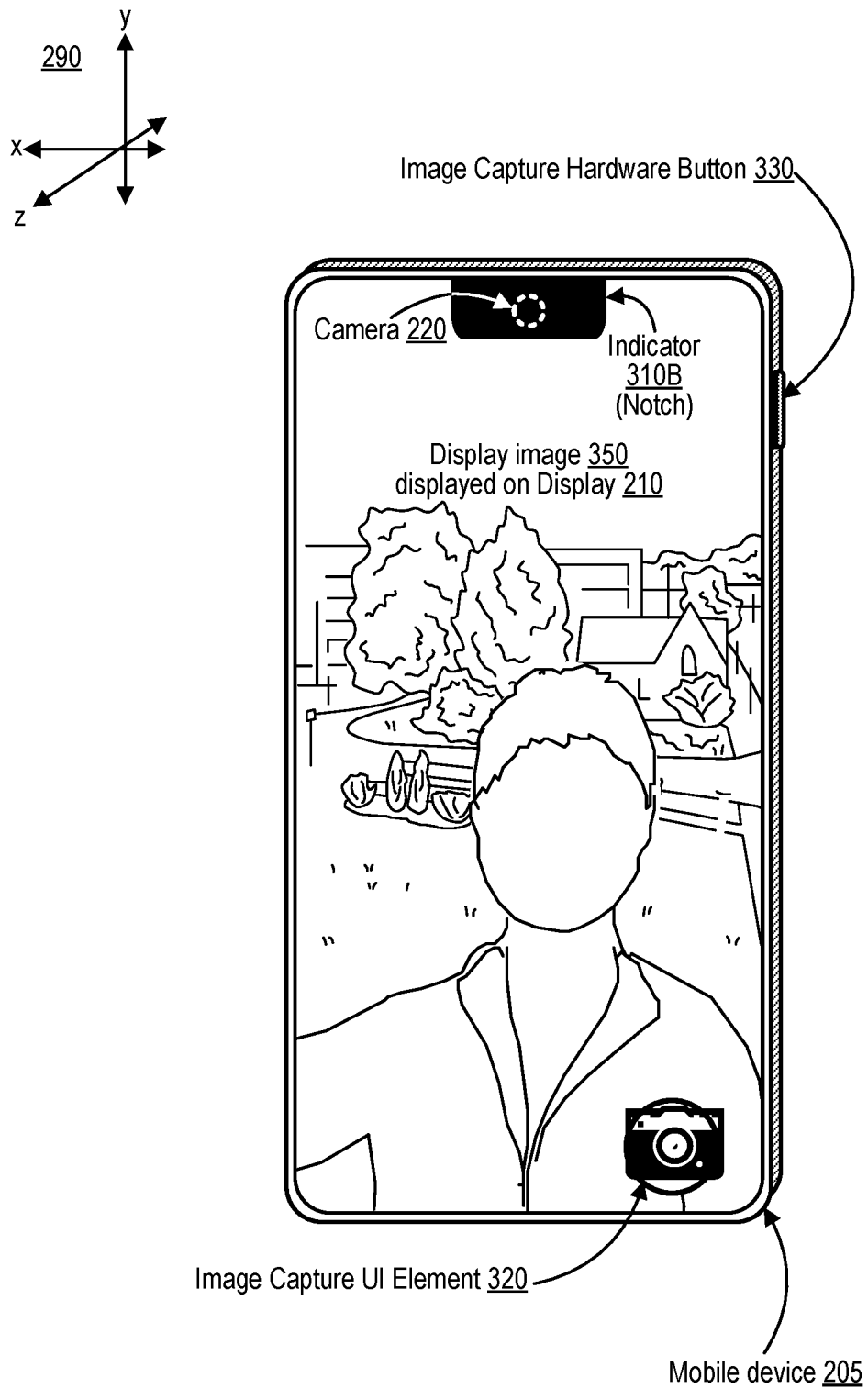
FIG. 3B is a front view of a mobile device with an under-display camera in which the display displays a black notch-shaped indicator over the camera.

FIG. 3B is a front view of a mobile device 205 with an under-display camera 220 in which the display 210 displays a black notch-shaped indicator 310B over the camera 220. The mobile device 205 displays the black notch-shaped indicator 310B in the indicator area that is over the camera 220 in the Z-axis. The legend 290 of FIG. 2A is also included in FIG. 3B. The mobile device 205 of FIG. 3B is similar to the mobile device 205 of FIG. 3A. The bezel-shaped indicator 310A of FIG. 3A is replaced by a notch-shaped indicator 310B in FIG. 3B. The notch-shaped indicator 310B can occupy less of the display 210 than the bezel-shaped indicator 310A, allowing the display image 350 to fill up more of the display 210.

Figure 3C:
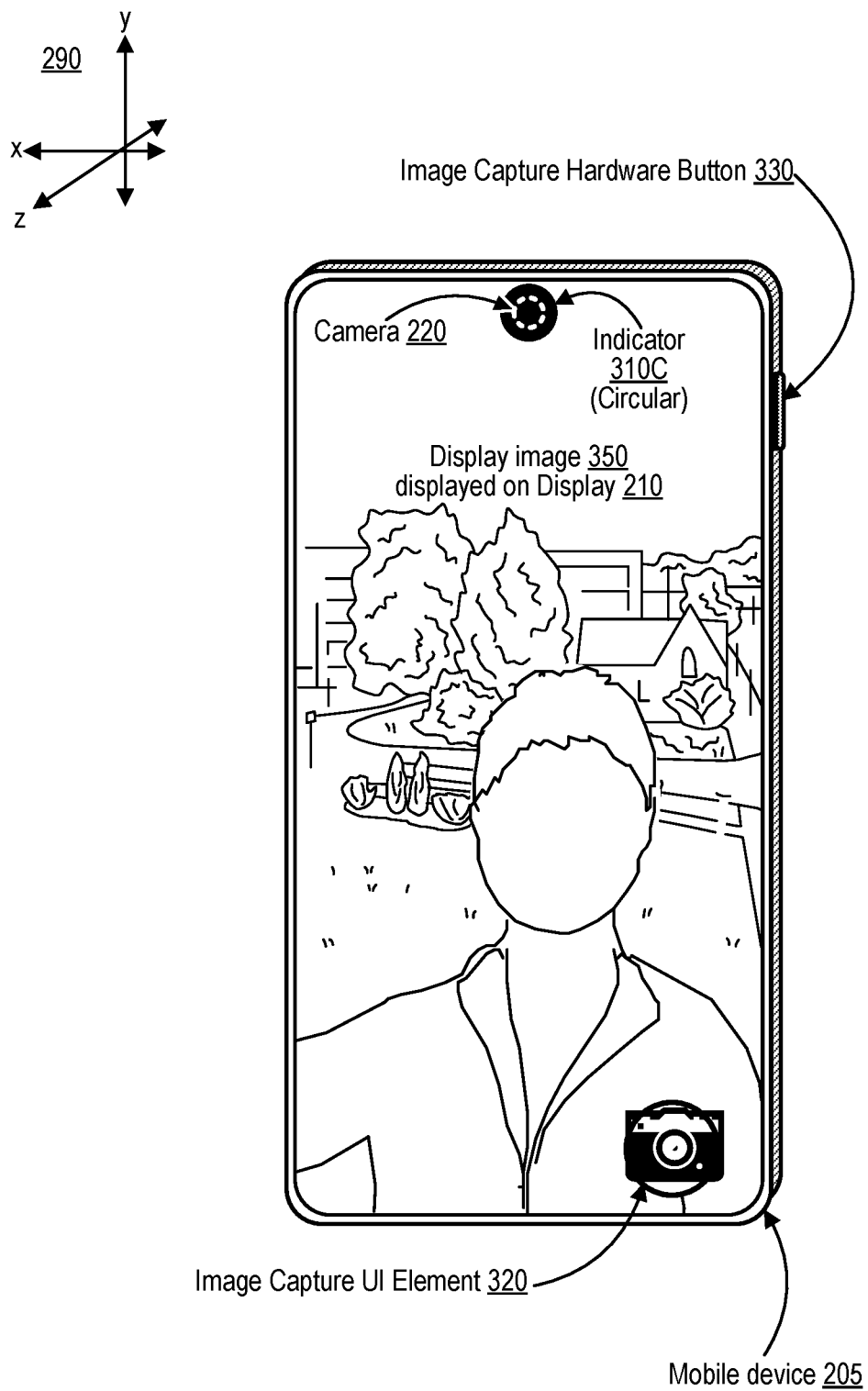
FIG. 3C is a front view of a mobile device with an under-display camera in which the display displays a black circular indicator over the camera.

FIG. 3C is a front view of a mobile device 205 with an under-display camera 220 in which the display 210 displays a black circular indicator 310C over the camera 220. The mobile device 205 displays the black circular indicator 310C in the indicator area that is over the camera 220 in the Z-axis The legend 290 of FIG. 2A is also included in FIG. 3C. The mobile device 205 of FIG. 3C is similar to the mobile device 205 of FIG. 3A and FIG. 3B. The bezel-shaped indicator 310A of FIG. 3A is replaced by a circular indicator 310C in FIG. 3C. The circular indicator 310C can occupy less of the display 210 than the bezel-shaped indicator 310A or the notch-shaped indicator 310B, allowing the display image 350 to fill up more of the display 210.

The indicators 310A, 310B, and 310C are illustrated in FIG. 3A, FIG. 3B, and FIG. 3C as being filled in with black pixels or pixels that are turned off. In some examples, indicators 310A, 310B, and/or 310C can be filled in with pixels of a different color, such as white, grey, red, green, blue, yellow, or some mixture of these colors. The color that the indicators 310A, 310B, and/or 310C are filled in with can have any hue, any luminosity, and any opacity. In some examples, the indicators 310A, 310B, and 310C may be filled in with a pattern, a texture, a gradient, or even another image distinct from the display image 350 that the indicators 310A, 310B, and 310C are overlaid over. In some examples, the indicators 310A. 310B, and 310C may be at least partially translucent or transparent.

In some examples, the indicators 310A, 310B, and 310C can be overlaid over the display image 350 consistently over a period of time, such as a period of time during which a photo capture software application is running on the mobile device 205 and/or a period of time during which the under-display camera 220 is activated. In some examples, the indicators 310A, 310B, and 310C can blink on and off periodically during the period of time. In some examples, the indicators 310A, 310B, and 310C fade in and out periodically during the period of time. In some examples, the indicator can be displayed, called out, emphasized, hidden, or some combination thereof in response to a user input. The user input includes at least one of a tap on the display, a hover over the display, a preconfigured gesture across the display, a user's preference setting, or a voice input from the user. In some examples, at least a subset of an indicator 310A, 310B, or 310C is animated, for example to include a border that periodically expands, contracts, pulsates, or some combination thereof.

In some examples, the mobile device 205 displays the indicators 310A, 310B, and/or 310C overlaid over the display image 350 by generating the display image 350 so that it includes the indicators 310A, 310B, and/or 310C. The camera 220 may capture an image, which the mobile device 205 may modify as discussed previously to generate the display image 350. The mobile device 205 may further modify the display image 350 to merge the display image 350 with the indicators 310A, 310B, and/or 310C. In some examples, the indicators 310A, 310B, and/or 310C are overlaid over the display image 350, but the display image 350 remains separate from the indicators 310A, 310B, and/or 310C. In some examples, the mobile device 205 overlays the indicators 310A, 310B, and/or 310C over the display image 350 using a blending effect. Blending effects may include, for example, a dissolve effect, a multiply effect, a darkening effect, a color burn effect, a linear burn effect, a lighten effect, a screen effect, a color dodge effect, a linear dodge effect, an overlay effect, a soft light effect, a hard light effect, a vivid light effect, a pin light effect, a hard mix effect, a difference effect, an exclusion effect, a subtract effect, a divide effect, a threshold effect, a hue blend effect, a saturation blend effect, a color blend effect, a luminosity blend effect, a lighter color comparison effect, a darker color comparison effect, or some combination thereof.

Figure 4:
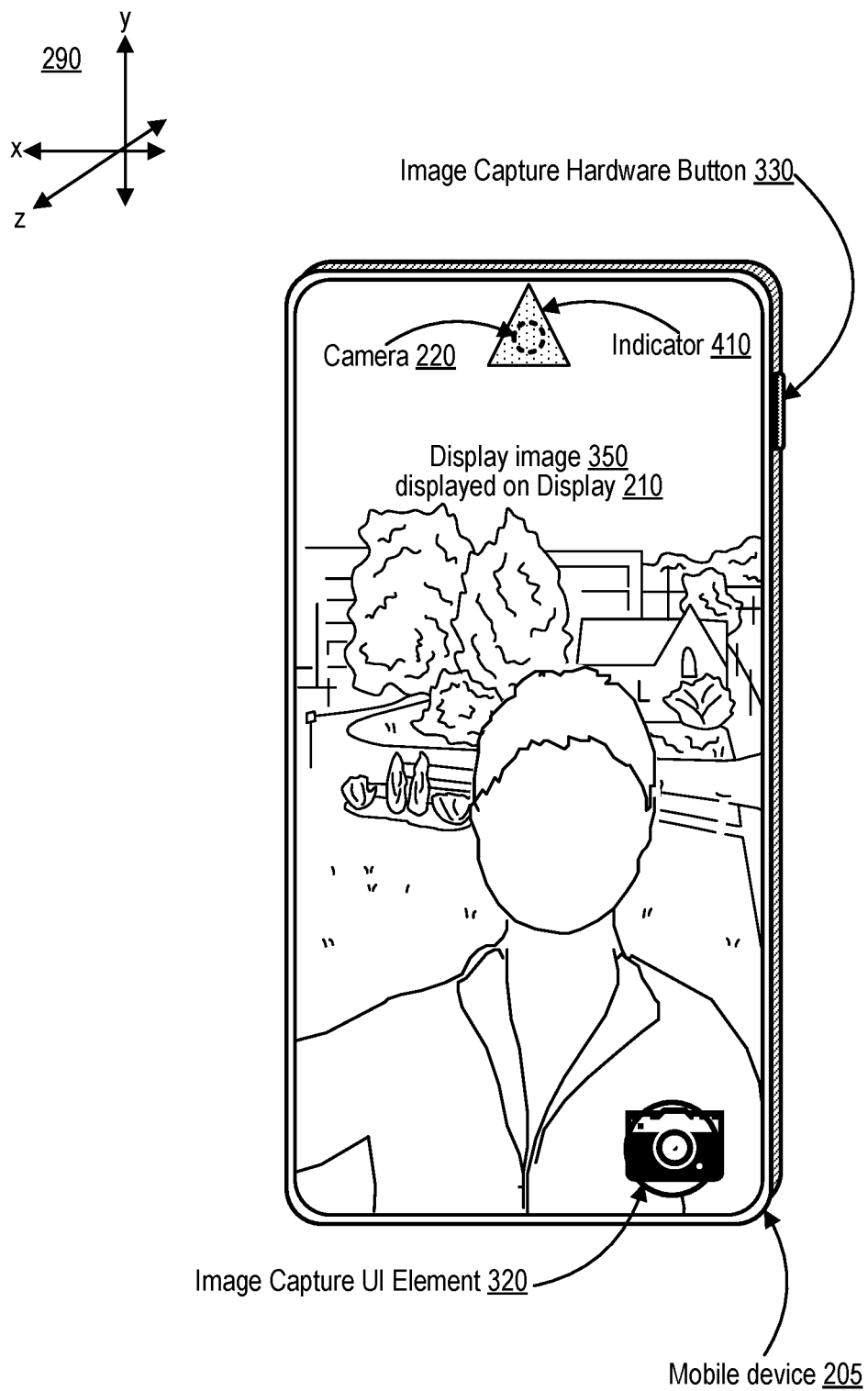
FIG. 4 is a front view of a mobile device with an under-display camera in which the display displays a triangular indicator around an area positioned over the camera.

FIG. 4 is a front view of a mobile device 205 with an under-display camera 220 in which the display 210 displays a triangular indicator 410 around an area positioned over the camera 220. The legend 290 of FIG. 2A is also included in FIG. 4. Like the mobile device 205 of FIG. 3A, FIG. 3B, and FIG. 3C, the mobile device 205 of FIG. 4 is illustrated displaying a display image 350 using its display 210. The display image 350 may be based on an image captured by the camera 220. The display image 350 may be displayed on the display 210 temporarily as a preview image to indicate to the user of the mobile device 205 how the scene that the camera 220 is receiving light from is framed in the field of view of the camera 220. The mobile device 205 displays the indicator 410 overlaid over the display image 350. The indicator 410 includes an indicator shape that outlines an area positioned over the camera 220. The example indicator 410 illustrated in FIG. 4 is triangular. The indicator 410 can be any shape. For instance, the indicator 410 can be a circle, a semicircle, a square, a triangle, a rectangle, an oval, a trapezoid, a parallelogram, a rhombus, a kite, a quadrilateral, a pentagon, a hexagon, a heptagon, an octagon, an enneagon, a decagon, a polygon with more than 10 sides, or another shape.

In addition to including a area outline of a triangular shape, the indicator 410 is illustrated in FIG. 4 filled in with a shaded pattern. This shaded pattern may represent a shaded area or otherwise filled-in area within the indicator shape of the indicator 410, similar to black sharding of the indicators 310A, 310B, and 310C. The shaded area within the outlined indicator shape of the indicator 410 may have any combination of the characteristics and traits discussed with respect to the indicators 310A, 310B, and 310C. For example, the shaded area within the outlined indicator shape of the indicator 410 may be patterned and translucent. In some cases, the outlined indicator shape of the indicator 410 serves as the border or edge of the shaded area. In some cases, the shaded area of the indicator 410 and the outlined indicator shape of the indicator 410 cover overlapping but distinct areas. In some examples, the shaded area may be removed from the indicator 410, or may blink on and off periodically. The indicator 410 can be the exclusive indicator of the position of the camera 220 underneath the display 210, or can be used in addition to other indicators such as one of the indicators 310A-C and/or indicator arrows 340.

The lines that make up the outlined indicator shape of the indicator 410 can be of any color, hue, luminosity, transparency, and/or thickness. The lines that make up the outlined indicator shape of the indicator 410 can be a solid color, can be patterned, can include a gradient, and/or can make up an image distinct from the display image 350 that the outlined indicator shape of the indicator 410 is overlaid over. The lines that make up the outlined indicator shape of the indicator 410 can include solid lines, dashed lines, dotted lines, dash-dotted lines, dot-dashed-lines, any other type of line, or a combination thereof. The lines that make up the outlined indicator shape of the indicator 410 can include single lines, double lines, triple lines, quadruple lines, more than four lines, or a combination thereof. In some examples, the outlined indicator shape of the indicator 410 is be overlaid over the display image 350 consistently over a period of time, such as a period of time during which a photo capture software application is running on the mobile device 205 and/or a period of time during which the under-display camera 220 is activated. In some examples, the outlined indicator shape of the indicator 410 blink on and off periodically during the period of time. In some examples, the outlined indicator shape of the indicator 410 fades in and out periodically during the period of time. In some examples, at least a subset of the outlined indicator shape of the indicator 410 is animated, for example periodically expanding, contracting, pulsating, or some combination thereof.

In some examples, the mobile device 205 displays the indicator 410 overlaid over the display image 350 by modifying the display image 350 to include the indicator 410. The modified display image may be a copy of the image merged with the indicator 410. In some examples, mobile device 205 blends the indicator 410 with the display image 350 that it overlays using a blending effect, such as any of the blending effects discussed with respect to the indicator areas 310A, 310B, and 310C.

The mobile device 205 of FIG. 4 also includes an image capture UI element 320 and an image capture hardware button 330. These elements may function similarly to the image capture UI element 320 and the image capture hardware button 330 of FIG. 3A. FIG. 3B, and FIG. 3C.

In some cases, the indicator 410, or any such indicator, may permanently be overlaid over the display image 350 on the display at an area of the display through which the camera 220 receives incident light. In some cases, the indicator 410, or any such indicator, may be hidden by default, and may be overlaid over the display image 350 on the display in response to receipt of an input. The input may be a touch of a touch-sensitive touchscreen surface of the display, a predefined gesture across the touch-sensitive touchscreen surface of the display, a hover over the display, a predefined gesture over the display, a voice input reciting a predefined phrase recorded by a microphone. For example, the user of the mobile device 205 may touch the touch-sensitive touchscreen surface of the display 210, triggering the mobile device 205 to display the indicator 410. The user may speak the phrase "where is my camera" or a similar phrase, which may act as a voice input. A microphone of the mobile device 205 (or coupled to the mobile device 205) may record the user saying this phrase as the voice input, and the mobile device 205 (or a remote voice-to-text interpretation server) may recognize that the voice input is saying a predefined phrase that triggers display of the indicator 410, triggering the mobile device 205 to display the indicator 410.

Figure 5:
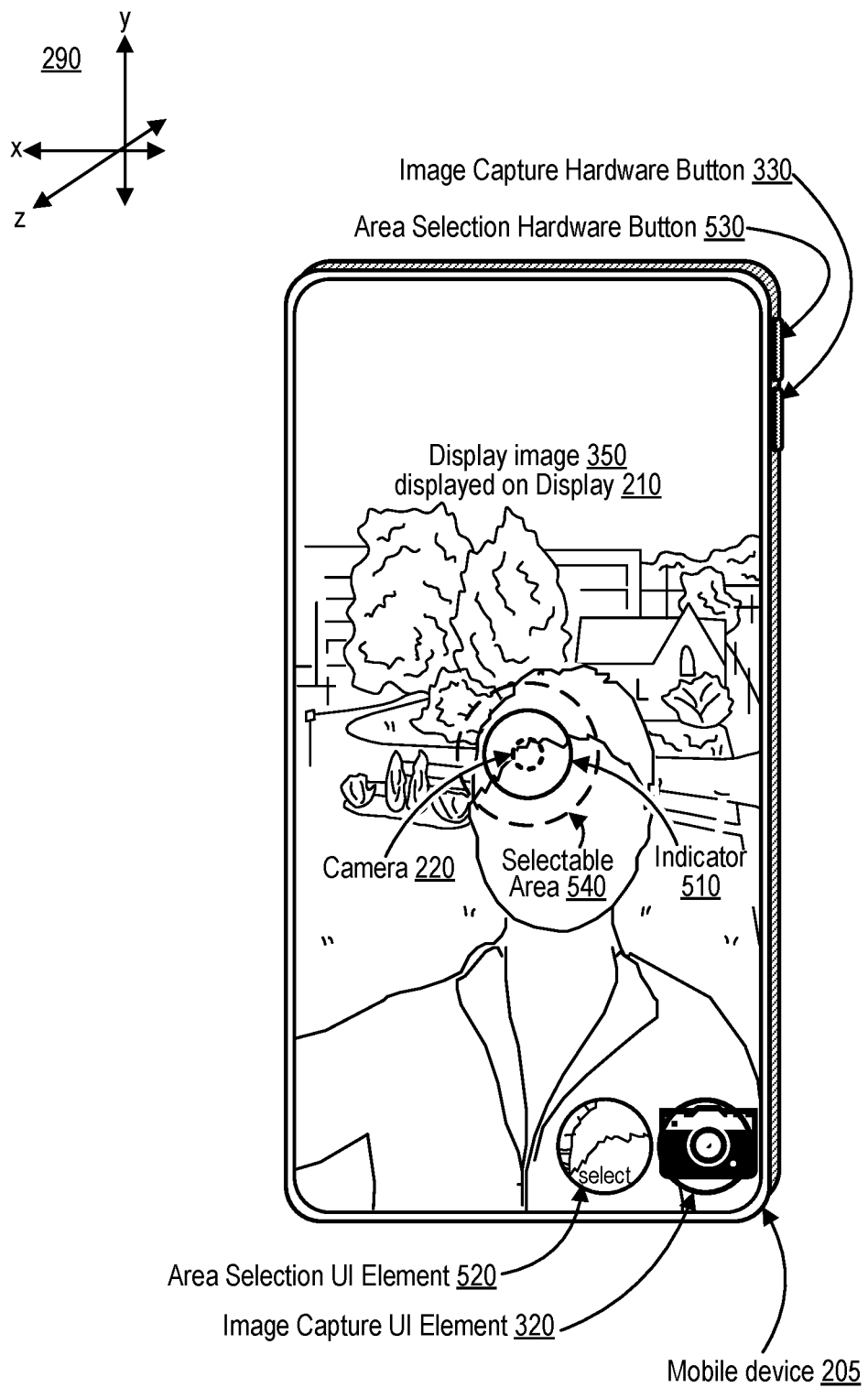
FIG. 5 is a front view of a mobile device with an under-display camera in which the display displays a circular indicator over the camera and an area selection user interface (UI) element to select a selectable area over the camera.

FIG. 5 is a front view of a mobile device 205 with an under-display camera 220 in which the display 210 displays a circular indicator 510 over the camera 220 and an area selection user interface (UI) element 520 to select a selectable area 540 over the camera 220. The legend 290 of FIG. 2A is also included in FIG. 5. Like the mobile device 205 of FIG. 3A, FIG. 3B, FIG. 3C, and FIG. 4, the mobile device 205 of FIG. 5 is illustrated displaying an display image 350 using its display 210. The display image 350 may be based on an image captured by the camera 220. The display image 350 may be displayed on the display 210 temporarily as a preview image to indicate to the user of the mobile device 205 how the scene that the camera 220 is receiving light from is framed in the field of view of the camera 220. The mobile device 205 displays the circular indicator 510 overlaid over the display image 350. The circular indicator 510 outlines an area positioned over the camera 220, and is not filled in.

It may be useful, in some software applications and associated user interfaces running on the mobile device 205, to select certain parts of an image. An image capture software application, and its associated user interface, may be configured to allow selection of a region of a display image 350. For example, an image capture software application may be configured to select a selectable area 540 of the display image 350 in response to a touch input or a touch gesture input to a touchscreen within or around the selectable area 540 of the display image 350. In some cases, the image capture software application may be configured to select the selectable area 540 of the display image 350 in response to a hover input, a pointing input, or a hover gesture input in which a user hovers over (along the Z axis) and/or gestures over (along the Z axis) the selectable area 540. In some cases, the image capture software application may be configured to select the selectable area 540 of the display image 350 in response to a voice input reciting a predefined phrase recorded by a microphone. For example, the user of the mobile device 205 may speak the phrase "select the area over the camera" or a similar phrase, which may act as a voice input. A microphone of the mobile device 205 (or coupled to the mobile device 205) may record the user saying this phrase as the voice input, and the mobile device 205 (or a remote voice-to-text interpretation server) may recognize that the voice input is saying a predefined phrase that triggers selection of the selectable area 540, triggering the mobile device 205 to select the selectable area 540.

In some examples, selection of the region of the preview image causes the mobile device 205 to instruct the camera 220 to perform an autofocus operation to adjust the focus of the camera 220 to improve focus on a portion of the photographed scene depicted in the selected selectable area 540 of the display image 350. This provides an intuitive interface allowing a user of the mobile device to modify a focus of the camera, for instance, from being focused on an object in the background of the scene to being focused on an object in the foreground of the scene, or vice versa. For instance, in the display image 350 illustrated being displayed on the display 210 in FIG. 4, the selectable area 540 depicts a portion of a person's face. The user may touch the touch-sensitive touchscreen surface of the display 210 at the selectable area 540 of the display 210, or hover over the surface of the display 210 at the selectable area 540 of the display 210, point at the selectable area 540 of the display 210, gesture toward and/or around the selectable area 540 of the display 210, or otherwise provide an input at the selectable area 540 of the display 210. This input may be referred to as a touch input, a hover input, a pointing input, a gesture input, or another type of input based on the type of interaction with the display 210. The mobile device 205, detecting this input, identifies that the coordinates of the input match coordinates of the display 210 upon which the region of the preview image that depicts the person's face is displayed. The mobile device 205 instructs the camera 220 to adjust the focus of the camera 220 to improve focus on the person's face, for instance by shifting from a first focus setting that optimizes focus on another object in the scene to a second focus setting that optimizes focus on the person's face. The camera 220 can then capture a second image while the focus of the camera 220 is set to the second focus setting. Because of the change in focus, the second image may be more focused on the person's face than the display image 350. The person's face may appear clearer and sharper in the second image than in the display image 350.

In some examples, selection of an area or region of the display image 350, such as the selectable area 540, can cause the mobile device 205 to instruct the camera 220 to set one or more settings associated with one or more properties of the camera 220 to improve application of the one or more properties based on the portion of the photographed scene depicted in the selected region or area of the display image 350. For instance one or more properties may include white balance, a black level compensation, a gamma correction, a gain, a color correction, a color saturation, a noise filter, a contrast control, a brightness control, a tone mapping, a sharpness, a blurring, a red eye correction, or some combination thereof. The camera 220 can capture a second image while the one or more settings associated with the one or more properties of the camera 220 are set. The camera 220 can then capture a second image while the one or more settings associated with the one or more properties of the camera 220 are set. Assuming the selected region or area is the selectable area 540, because the one or more settings are set based on the selection of the selectable area 540, the second image may use settings that improve depiction of the person's face compared to the depiction of the person's face in the display image 350. The person's face may appear clearer and sharper in the second image than in the display image 350.

Because the camera 220 is underneath the display 210 along the Z axis, receipt of certain inputs, such as inputs for selection of certain regions of the display image 350, occlude the view of the camera 220. Such inputs may include touch inputs, touch gesture inputs, hover inputs, pointing inputs, hover gesture inputs, or any other kinds of inputs discussed herein. For instance, a user providing a touch input or a touch gesture input by interacting with the touch-sensitive touchscreen surface of the display 210 while the under-display camera 220 is active may at least partially occlude the view of the camera 220 with the user's finger, stylus, hand, arm, or pointer by touching a portion of the display 210 that is positioned over the under-display camera 220. Even if the touch input is received at a particular area of the display 210 that is not directly over the camera 220, a portion of the user's arm or hand may reach over the camera 220 and thus at least partially occlude the view of the camera 220 in order to reach the particular area of the display 210. Similarly, a user may provide a hover input, a pointing input, or a hover gesture input by hovering over the display 210, pointing at the display 210, and/or gesturing over the display 210 with the user's hand and/or a pointing device. Such hover inputs, pointing inputs, and hover gesture inputs can likewise occlude the camera 220 by blocking light from reaching an area of the display through which light would otherwise pass before reaching the camera 220.

In some examples, occlusion of the view of the camera 220 may refer to the camera 220 being steered away from a target field of view (FOV). The mobile device 205 may determine the target FOV based on the software application being run by the mobile device 205. For example, if the mobile device 205 is running a videoconferencing software application, the mobile device 205 may determine that the target FOV is any FOV of the camera 220 that includes a depiction of a face of a user. If the mobile device 205 is moved (e.g., is accidentally dropped) such that the FOV of the camera 220 no longer fits the predetermined criteria of the target FOV in that the FOV of the camera 220 no longer includes a depiction of a face of a user. In some cases, the mobile device 205 may treat any time during which the FOV of the camera 220 does not match the target FOV as a time during which the camera 220 is occluded.

The mobile device 205 of FIG. 5 includes an area selection hardware button 530. The mobile device 205 may receive an area selection input when the area selection hardware button 530 is pressed. In some cases, the area selection hardware button 530 can be replaced and/or supplemented with another hardware user interface that receives the image capture input. In response to receipt of the area selection input, the mobile device 205 may select a selectable area 540 of the display image 350 displayed on the display 210.

The mobile device 205 also includes an area selection user interface (UI) element 520 that is displayed on a UI area of the display 210, overlaid over the display image 350. The mobile device 205 may receive an area selection input at the area selection user UI element 520 of the display 210. The area selection input may include a touch input, a touch gesture input, a hover input, a hover pointing input, a hover gesture input, or any other type of input discussed herein. For example, a touch input or a touch gesture input may include touch of the touch-sensitive touchscreen surface of the display 210 receives a touch area at the area selection user UI element 520 of the display 210. A hover input may include a user hover over (in the Z axis) the area selection user UI element 520 of the display 210. In some cases, a voice input may be used. In some cases, the image capture software application may be configured to select the selectable area 540 of the display image 350 in response to a voice input reciting a predefined phrase recorded by a microphone as discussed herein.

As discussed above, selection of the selectable area 540 of the display image 350 using the area selection input from the area selection hardware button 530 and/or the area selection UI element 520 may cause the mobile device 205 to instruct the camera 220 to set one or more settings associated with one or more properties of the camera 220 to improve application of the one or more properties based on the portion of the photographed scene depicted in the selectable area 540 of the display image 350. For instance, selection of the selectable area 540 of the display image 350 using the area selection input may cause the mobile device 205 to instruct the camera 220 to adjust its focus to improve focus on a portion of the photographed scene depicted in the selectable area 540 of the display image 350. Because the user may select the selectable area 540 of the display image 350 by pressing the area selection hardware button 530 and/or by providing an input at the area selection UI element 520, the user no longer needs to occlude the camera 220 to select the selectable area 540. While the selectable area 540 illustrated in FIG. 5 is an area includes a portion of the display 210 positioned directly over the camera 220, the selectable area need not include the portion of the display 210 positioned directly over the camera 220. In some cases, the selectable area 540 of the display image 350 may include a portion of the display image 350 that a user may need to reach over the camera 220 to touch, hover over, point to, gesture toward, gesture around, or otherwise provide an input to.

To make it clear that receipt of an input at the area selection UI element 520 selects the selectable area 540 of the display image 350, the example area selection UI element 520 of FIG. 5 may include the word "select" over a visual copy of the selectable area 540 of the image. Alternatively, an input indicator (e.g., an arrow indicator, a hand-shaped indicator, a palm-shaped indicator, and the like) may be provided to direct the user to touch the selectable area. The visual copy of the selectable area 540 of the display image 350 may be modified (e.g., downscaled, upscaled, scaled, cropped, stretched, squished, skewed, distorted, or a combination thereof) to fit the size of the area selection UI element 520. In some examples, the area selection UI element 520 may act as a virtual button, and may select the entirety of the selectable area 540 when any part of the area selection UI element 520 receives an input, such as a touch, a hover, a point, a gesture, any input type discussed herein, or a combination thereof. In some examples, the visual copy of the selectable area 540 of the display image 350 in the area selection UI element 520 may act as an offset version of the selectable area 540. A user providing an input to a specific portion of the visual copy of the selectable area 540 of the display image 350 in the area selection UI element 520 may select that specific portion of the selectable area 540 of the display image 350. In some examples, the area selection UI element 520 may control a cursor. The user may swipe, slide, or otherwise move a touch input at the area selection UI element 520 to move the cursor. The user may similarly use a swiping or sliding gesture while hovering over the area selection UI element 520 to move the cursor. Selection of the selectable area 540 may be performed by moving the cursor to the selectable area 540 of the display image 350 and tapping the area selection UI element 520, pressing a button such as the area selection hardware button 530, using a pointing movement gesture, or triggering another hardware interface element. In some examples, the mobile device 205 may also allow a user to select the selectable area 540 of the display image 350 by drawing a shape around the selectable area 540 using the cursor. In some examples, the mobile device 205 may also allow a user to select the selectable area 540 of the display image 350 by drawing a shape around the selectable area 540 using touch input, hover input, gesture input, or another form of input around the selectable area 540.

The mobile device 205 of FIG. 5 also includes an image capture UI element 320 and an image capture hardware button 330. These elements may function similarly to the image capture UI element 320 and the image capture hardware button 330 of FIG. 3A, FIG. 3B, FIG. 3C, and FIG. 4. While the image capture hardware button 330 and the area selection hardware button 530 are illustrated along a single side of the mobile device 205, one or both can be located along different portions of the mobile device 205. For example, one or both can be located along a rear, top, or bottom of the mobile device 205. Any other hardware interface elements used in place of the image capture hardware button 330 and/or the area selection hardware button 530 may similarly be located along a rear, top, or bottom of the mobile device 205.

Figure 6:
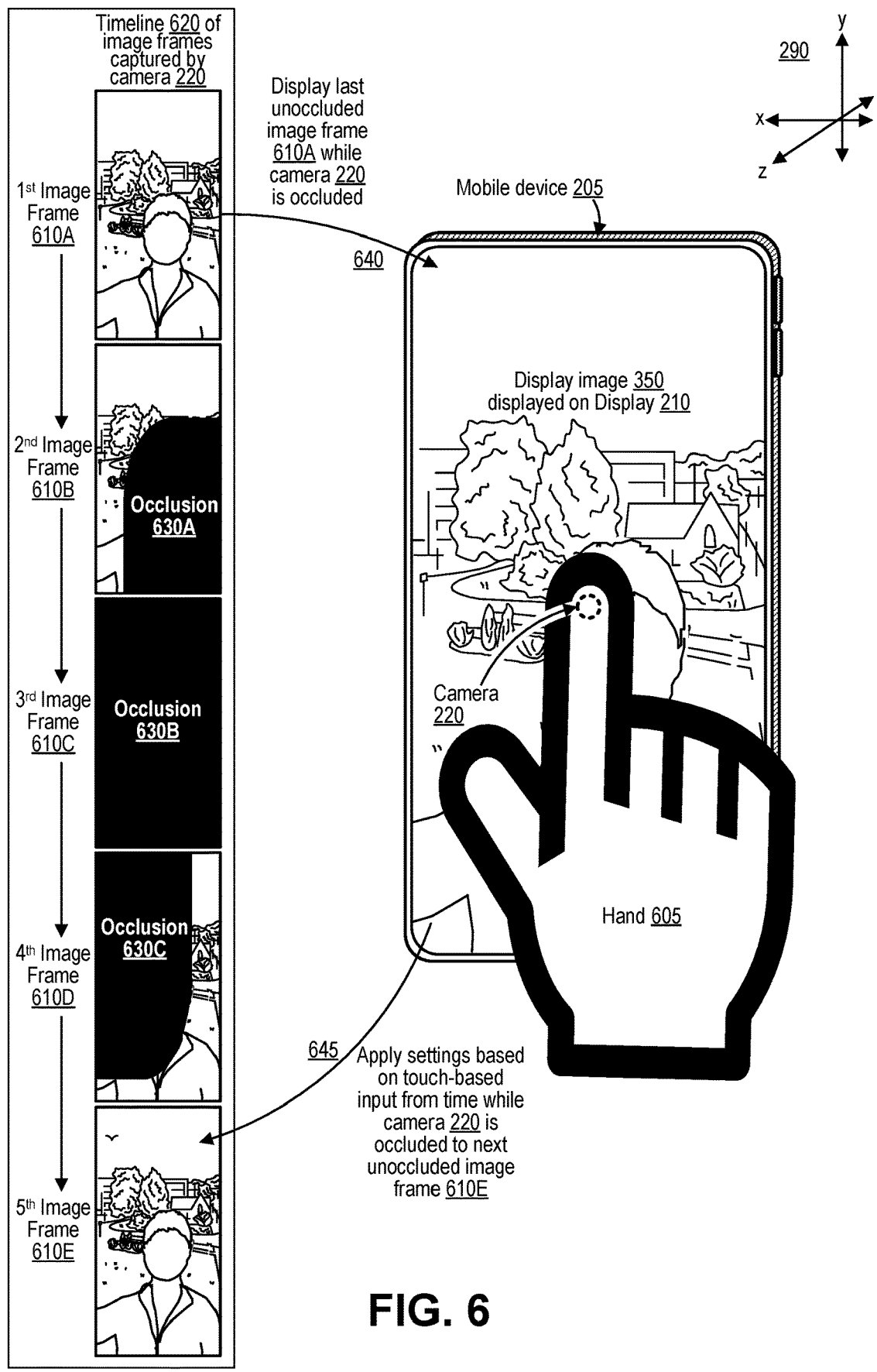
FIG. 6 is a front view of a mobile device that compensates for occlusion of an under-display camera by a user's hand during a touch, hover, or gesture input.

FIG. 6 is a front view of a mobile device 205 that compensates for occlusion of an under-display camera 220 by a user's hand 605 during a touch, hover, or gesture input. The legend 290 of FIG. 2A is also included in FIG. 6. Like the mobile device 205 of FIG. 3A, FIG. 3B, FIG. 3C, FIG. 4, and FIG. 5, the mobile device 205 of FIG. 6 is illustrated displaying the display image 350 using its display 210. The display image 350 may be based on an image captured by the camera 220. The display image 350 may be displayed on the display 210 temporarily as a preview image to indicate to the user of the mobile device 205 how the scene that the camera 220 is receiving light from is framed in the view of the camera 220.

A hand 605 is illustrated occluding the under-display camera 220 of the mobile device 205 in FIG. 6. The hand 605 has a finger outstretched, with the tip of the finger positioned over the camera 220, occluding light from the scene from reaching the camera 220. The outstretched finger of the hand 605 may be touching a touch input area of the touch-sensitive touchscreen surface of the display 210, hovering over an input area of the display 210, pointing at an input area of the display 210, gesturing toward an input area of the display, gesturing around an input area of the display 210 or some combination thereof. The input area of the display 210 may be the selectable area 540 of FIG. 5, or another selectable area of the display image 350. This input to the input area of the display may be used to select a selectable area of the display image 350, such as the selectable area 540 of the display image 350. The input area includes an area of the display 210 that is positioned over the camera 220 through which incident light that reaches the camera 220 passes. The input area may be positioned over the camera 220, adjacent to the camera 220, and/or within a predetermined radius of the camera 220.

A timeline 620 of image frames captured by the camera 220 is illustrated in FIG. 6. The timeline 620 of image frames captured by the camera 220 includes a first image frame 610A, a second image frame 610B, a third image frame 610C, a fourth image frame 610D, and a fifth image frame 610E. In some examples, the image frames 610A-E in the timeline 620 may be image frames that are captured consecutively by the camera 220. In some examples, one or more additional image frames may exist between any two of the image frames in the timeline 620. The image frames 610A-E in the timeline 620 depict a scene that is similar to the scene depicted in the display image 350, but in some cases includes occlusions and/or other variations.

In the timeline 620, the first image frame 610A depicts a scene with a person in the foreground in front of a background with buildings, grass, and trees. The first image frame 610A is not occluded. The second image frame 610B is captured by the camera 220 after the first image frame 610A. The second image frame 610B is partially occluded by an occlusion 630A, which appears as a black or dark area covering a portion of the second image frame 610B. The occlusion 630A may, for example, be caused by a portion of the extended finger of the hand 605 approaching the view of the camera 220 as the hand 605 is moving. The hand 605 blocks some of the light from the scene that would otherwise pass through the display 210 and reach the camera 220. The third image frame 610C is captured by the camera 220 after the second image frame 610B. The third image frame 610C is fully occluded by an occlusion 630B, and is thus entirely covered in blackness or darkness. The occlusion 630B may, for example, be caused by the extended finger of the hand 605 entirely occluding the view of the camera 220 as the hand 605 is moving. The hand 605 blocks most or all of the light from the scene that would otherwise pass through the display 210 and reach the camera 220. The fourth image frame 610D is captured by the camera 220 after the third image frame 610C. The fourth image frame 610D is partially occluded by an occlusion 630C, which appears as a black or dark area covering a portion of the fourth image frame 610D. The hand 605 blocks some of the light from the scene that would otherwise pass through the display 210 and reach the camera 220. The occlusion 630C may, for example, be caused by a portion of the extended finger of the hand 605 leaving the view of the camera 220 as the hand 605 is moving. The fifth image frame 610E is captured by the camera 220 after the fourth image frame 610D. The fifth image frame 610E depicts a similar scene as the first image frame 610A, though some minor changes have occurred in the scene due to passage of time between capture of the first image frame 610A and the fifth image frame 610E. For instance, the scene depicted in the fifth image frame 610E includes a bird in the sky that is not present in the first image frame 610A.

Displaying the second image frame 610B, the third image frame 610C, and/or the fourth image frame 610D on the display 210 as preview images would result in display of the occlusions 630A-C on the on the display 210. In some cases, a user may find the presence of the occlusions 630A-C in a preview image unhelpful. In some examples, for the duration of a time in which the camera 220 is at least partially occluded, the mobile device 205 displays the last unoccluded image frame from before the occlusion. In the timeline 620, the last unoccluded image frame from before the occlusion is the first image frame 610A. This is indicated by the arrow 640. In some examples, for the duration of a time in which the camera 220 is fully occluded (as in the occlusion 630B of the third image frame 610C), the mobile device 205 displays the last partially unoccluded image frame from before the full occlusion 630B. In the timeline 620, the last partially unoccluded image frame from before the full occlusion 630B is the second image frame 610B. In some examples, the mobile device 205 displays the last image frame in which less than a predetermined maximum threshold percentage of the view of the camera 220 is occluded for a duration of time while more than the predetermined maximum threshold percentage of the view of the camera 220 is occluded.

In some cases, a touch input or other input may be received while the camera 220 is at least partially occluded. In some examples, mobile device 205 may receive a touch input in response to the extended finger of the hand 605 touching a touch input area of the touch-sensitive touchscreen surface of the display 210 at a time after capture of the first image frame 610A and before capture of the fifth image frame 610E. The mobile device 205 may select a selectable area of the image, such as the selectable area 540 of FIG. 5, based on the location of the display 210 at which the touch input is received at least partially overlapping with the selectable area 540. The mobile device 205 may instruct the camera 220 to set one or more settings for one or more properties of the camera 220 to adjust application of the one or more properties based on the portion of the photographed scene depicted in the selected area in the next unoccluded image frame after the occlusion is removed. The next unoccluded image frame after the occlusion, in the timeline 620, is the fifth image frame 610E. Thus, the mobile device 205 may instruct the camera 220 to set the one or more settings for the one or more properties of the camera 220 to adjust application of the one or more properties based on the portion of the photographed scene depicted in the selected area in the last unoccluded image frame from before the occlusion.

In one illustrative example, while the camera 220 is at least partially occluded, the mobile device 205 may still display the first image frame 610A, and the user may tap a selectable area of the first image frame 610A depicting the user's face with the user's hand 605. The mobile device 205 receives a touch input at the touch-sensitive touchscreen surface of the display 210 at a portion of the display that displays the selectable area of the first image frame 610A. The mobile device 205, detecting this touch input, identifies that the coordinates of the touch input match the coordinates of the display 210 upon which the region of the first image frame 610A that depicts the user's face is displayed. The mobile device 205 instructs the camera 220 to adjust the focus of the camera 220 to improve focus on the user's face for the next unoccluded image frame after the occlusion—the fifth image frame 610E. The mobile device 205 shifting from a first focus setting that optimizes focus on another object in the scene to a second focus setting that optimizes focus on the user's face. Once the camera 220 captures the fifth image frame 610E, the focus of the camera 220 may already be set to the second focus setting that optimizes focus on the user's face.

Figure 7:
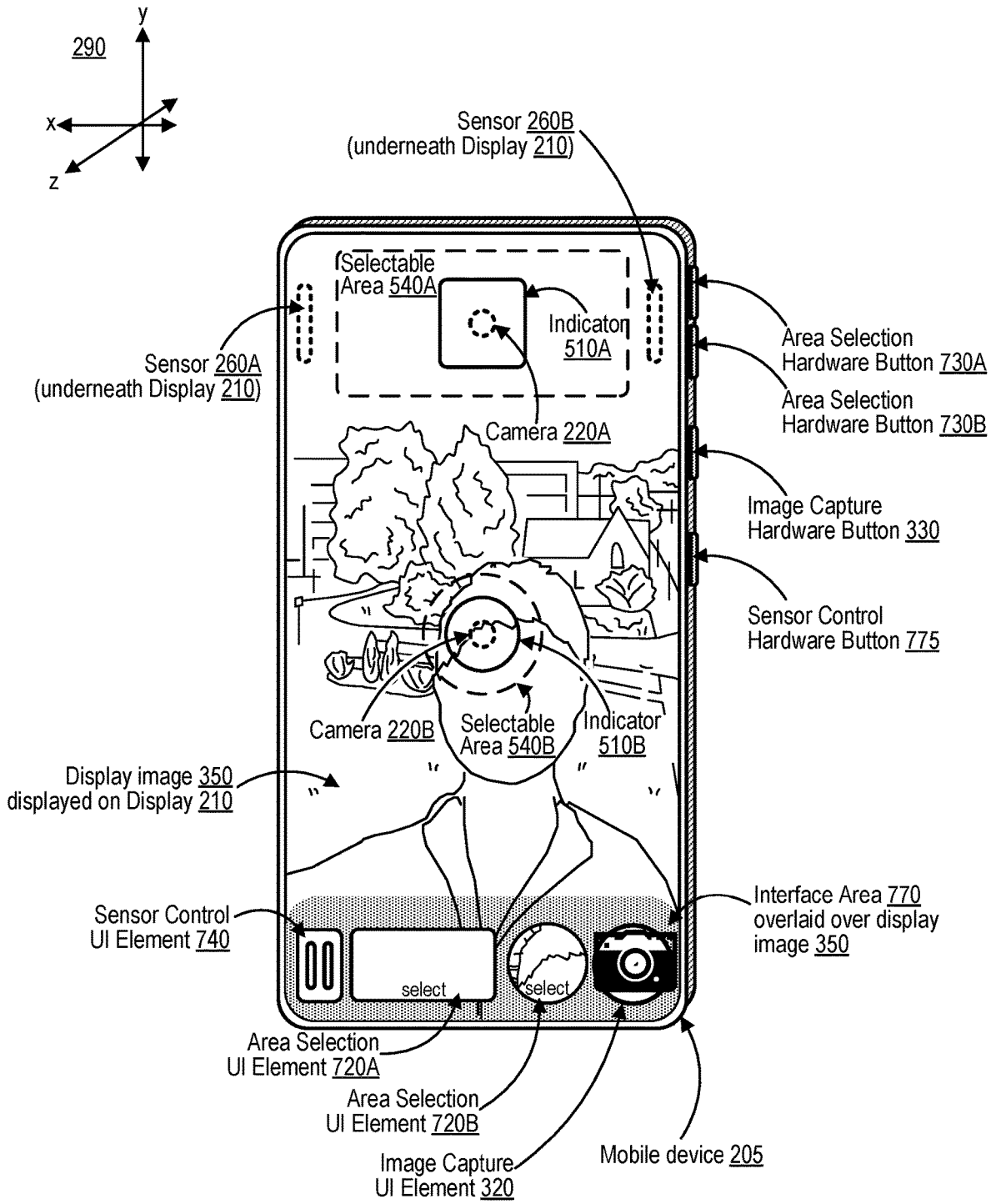
FIG. 7 is a front view of a mobile device with multiple under-display cameras and under-display sensors in which the display displays an interface area for controlling the multiple under-display cameras and under-display sensors.

FIG. 7 is a front view of a mobile device 205 with multiple under-display cameras 220A-220B and under-display sensors 260A-260B in which the display 210 displays an interface area 770 for controlling the multiple under-display cameras 220A-220B and under-display sensors 260A-260B. The legend 290 of FIG. 2A is also included in FIG. 7. Like the mobile device 205 of FIG. 2D, the mobile device 205 of FIG. 7 includes a first under-display camera 220A and a second under-display camera 220B. The first under-display camera 220A and the second under-display camera 220B may each be any type of camera, and have any of the camera properties, discussed herein with respect to the camera 220, the first under-display camera 220A of FIG. 2D, the second under-display camera 220B of FIG. 2D, the image capture device 105A, the image processing device 105B, the image capture and processing system 100, any other camera discussed herein, or any combination thereof. The first under-display camera 220A may also be referred to as the first camera 220A. The second under-display camera 220B may also be referred to as the second camera 220B.

Like the mobile device 205 of FIG. 3A, FIG. 3B, FIG. 3C, FIG. 4, FIG. 5, and FIG. 6, the mobile device 205 of FIG. 7 is illustrated displaying the display image 350 using its display 210. The display image 350 may be based on an image captured by the first camera 220A or by the second camera 220B. The display image 350 may be displayed on the display 210 temporarily as a preview image to indicate to the user of the mobile device 205 the field of view of the first camera 220A or the field of view of the second camera 220B.

The second camera 220B of FIG. 7 appears in the same position as the camera 220 of FIG. 5. The display 210 displays a circular indicator 510B around the second camera 220B and within the selectable area 540B over the second camera 220B. The second indicator 510B of FIG. 7 appears circular and the same as the indicator 510 of FIG. 5. The second selectable area 540B over the second camera 220B of FIG. 7 is also circular, and appears to have the same shape and size and position as the selectable area 540 over the camera 220 of FIG. 5. In other examples, the second camera 220B, the second indicator 510B, and/or the second selectable area 540B may be different than those in FIG. 5.

The first camera 220A of FIG. 7 appears near the top of the display 210, similarly to the first camera 220A in FIG. 2D, the camera 220 in FIG. 3A, the camera 220 in FIG. 3B, the camera 220 in FIG. 3C, and the camera 220 in FIG. 4. The display 210 displays a first indicator 510A around the first camera 220A that is a rounded rectangle and lies within a first selectable area 540A over the first camera 220A. The first selectable area 540A over the first camera 220A of FIG. 7 is a large rounded rectangle that includes a majority of the sky as depicted in the display image 350. In other examples, the second camera 220B, the second indicator 510B, and/or the second selectable area 540B may be different than those in FIG. 5.

The interface area 770 appears as a shaded translucent area overlaid over the image displayed on the display 210. The interface area 770 includes the image capture UI element 320, an first area selection UI element 720A, a second area selection UI element 720B, and a sensor control UI element 740. The first area selection UI element 720A and the second area selection UI element 720B of FIG. 7 function similarly to the area selection UI element 520 of FIG. 5. Likewise, the first area selection hardware button 730A and the second area selection hardware button 730B of FIG. 7 function similarly to the area selection hardware button 530 of FIG. 5. The mobile device 205 selects the first selectable area 540A upon receipt of an input at the first area selection UI element 720A. The mobile device 205 selects the first selectable area 540A upon receipt of an input at the first area selection hardware button 730A. A user wishing to select the sky as depicted in the display image 350 can provide an input to the first area selection UI element 720A and/or can provide an input to the first area selection hardware button 730A to do so. The mobile device 205 selects the second selectable area 540B upon receipt of an input at the second area selection UI element 720B. The mobile device 205 selects the second selectable area 540B upon receipt of an input at the second area selection hardware button 730B. A user wishing to select the person's face as depicted in the display image 350 can provide an input to the second area selection UI element 720B and/or can provide an input to the second area selection hardware button 730B to do so.

In some cases, one of the first camera 220A or the second camera 220B can be disabled for a certain purpose or software application. In some cases, one of the first camera 220A or the second camera 220B can be activated for a certain purpose or software application. For example, if the mobile device 205 is running a videoconferencing software that is conducting a videoconference, the first camera 220A may be disabled for use in the videoconference, and the second camera 220B may be activated for use in the videoconference. In a videoconference, the user of the mobile device 205 is videoconferencing with a second user. The user of the mobile device 205 generally looks at the second user's face, which is displayed on the display 210. The second user's face may be displayed approximately centered on the display 210. During such a videoconference, the user of the mobile device 205 may naturally look toward the center of the display 210 because the user is looking at the other user's face. Because the second camera 220B is closer to the center of the display 210 than the first camera 220A, a user that is looking at the other user's face as displayed in the display 210 is also looking either directly at the second camera 220B or at a point that is closer to the second camera 220B than to the first camera 220A. An image captured by the second camera 220B while the user is looking at the user's face as displayed in the display 210 therefore depicts the user making eye contact with the second camera 220B, or making eye contact with a point close to the second camera 220B. By using the second camera 220B rather than the first camera 220A in the videoconference, the image of the user making eye contact captured by the second camera 220B is sent to the second user's device, and is displayed at the second user's device. The image captured by the second camera 220B, when displayed on the second user's device, then appears to be making eye contact with the second user as the second user views the image as displayed on the second user's device. In videoconferencing, there is generally no need to touch, hover over, or otherwise interact with the center of the display 210, so occlusion of the second camera 220B is unlikely during videoconferencing. Thus, use of the second camera 220B for videoconferencing improves videoconferencing by improving the appearance of eye contact between the user and the second user. This appearance of eye contact generally cannot be achieved with cameras that are more offset, such as the first camera 220A, other than through image manipulation that modifies depictions of the user's eyes. Such image manipulation can appear unnatural and produce an undesirable uncanny valley effect.

On the other hand, a software application in which user selection of areas of the display image 350 are anticipated and/or expected may use the first camera 220A and disable the second camera 220B. The first camera 220A which is closer than the second camera 220B to the top side of the mobile device 205. Thus, the first camera 220A is less likely than the second camera 220B to be occluded by a user holding the mobile device 205 with the bottom side of the mobile device 205 being closer to the user's body than the top side of the mobile device 205. For instance, a software application in which a user draws on or otherwise edits their own selfie may user the first camera 220A and disable the second camera 220B, as inputs to select areas of a display image 350 are anticipated and/or expected in such a software application.

In some cases, the mobile device 205 may switch which of the cameras is active and which of the cameras is disabled based on occlusion of the cameras. For instance, if the first camera 220A is active, and the mobile device 205 detects an occlusion similar to one of the occlusions 630A-C occluding light from being received by the first camera 220A, the mobile device 205 may disable the first camera 220A and activate the second camera 220B. Likewise, if the second camera 220B is active, and the mobile device 205 detects an occlusion similar to one of the occlusions 630A-C occluding light from being received by the second camera 220B, the mobile device 205 may disable the second camera 220B and activate the first camera 220A.

Similarly to the under-display sensor 260 of the mobile device 205 of FIG. 2D, the mobile device 205 of FIG. 7 includes a first under-display sensor 260A and a second under-display sensor 260B. The first under-display sensor 260A and the second under-display sensor 260B may each be any type of sensor, and have any of the sensor properties, discussed herein with respect to the under-display sensor 260, any other camera or sensor discussed herein, or any combination thereof. The mobile device 205 can trigger use and/or control over one or both of the sensor 260A and/or the sensor 260B upon receipt of an input at the sensor control UI element 740, and/or upon receipt of an input at the sensor control hardware button 775. While a single sensor control UI element 740 and a single sensor control hardware button 775 are illustrated in FIG. 7, in some cases a mobile device 205 may include a separate sensor control UI element 740 for each of the sensors 260A-260B and/or a separate sensor control hardware button 775 for each of the sensors 260A-260B. The mobile device 205 can select a selectable area of the display image 350 over the first sensor 260A upon receipt of an input at a sensor control UI element 740 and/or a sensor control hardware button 775 corresponding to the first sensor 260A. The mobile device 205 can select a selectable of the display image 350 over the second sensor 260B upon receipt of an input at a sensor control UI element 740 and/or a sensor control hardware button 775 corresponding to the second sensor 260B.

The mobile device 205 may activate the first sensor 260A and the second sensor 260B simultaneously, or within the same time window, so that the mobile device 205 can gather more sensor data and obtain a more complete and accurate understanding of the environment. For example, if the first sensor 260A is a RADAR sensor and the second sensor 260B is a LIDAR sensor, then the mobile device 205 can activate both sensors 260A-260B and can use sensor measurement data from both sensors 260A-260B and/or from the cameras 220A-220B to obtain detailed and accurate depth information of the scene depicted in the display image 350. Different ones of the sensors 260A-260B can be activated and disabled at different times, for instance based on what software application is running on the mobile device 205. One software application may trigger the mobile device 205 to activate the first sensor 260A but disable the second sensor 260B. Another software application may trigger the mobile device 205 to activate the second sensor 260B but disable the first sensor 260A. Another software application may trigger the mobile device 205 to activate both the first sensor 260A and the second sensor 260B. Another software application may trigger the mobile device 205 to disable both the first sensor 260A and the second sensor 260B. The mobile device 205 can in some situations detect an occlusion of one of the sensors 260A-260B, in which the mobile device 205 can disable the occluded sensor and activate the other (non-occluded) sensor. For example, the mobile device 205 can detect an occlusion of one of the sensors 260A-260B when a sensor returns a sensor measurement indicating detection of an object that is less than a threshold distance away from the sensor. In some cases, a sensor of the sensors 260A-260B may be positioned within a threshold distance of a camera of the cameras 220A-220B. If the mobile device 205 detects an occlusion of such a camera (e.g., as in the occlusion 630A-C of FIG. 6), the mobile device 205 can assume that the sensor that is positioned within the threshold distance of the camera. For example, in FIG. 7, the sensors 260A-260B may be within the threshold distance of the first camera 220A. If the mobile device 205 detects an occlusion of the first camera 220A, the mobile device 205 may assume that the sensors 260A-260B are also occluded. This type of occlusion detection may be useful when one or more of the sensors 260A-260B are of a sensor type that may be difficult to detect occlusion of, such as microphones.

Figure 8:
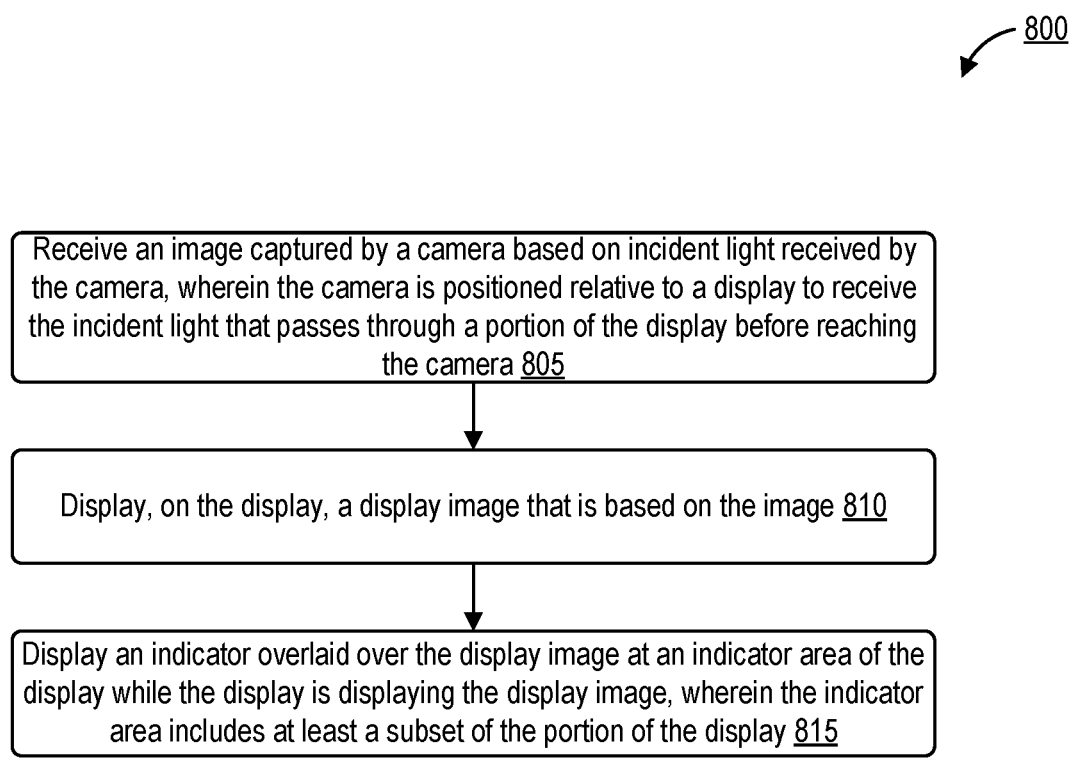
FIG. 8 is a flow diagram illustrating an example of an image processing technique.

FIG. 8 is a flow diagram illustrating an image processing technique 800. The image processing technique 800 illustrated by the flow diagram of FIG. 8 may be performed by a device. The device may be a mobile device 205, an image capture and processing system 100, an image capture device 105A, an image processing device 105B, one or more network servers of a cloud service, a computing system 1000, or some combination thereof.

At operation 805, the device receives an image captured by a camera 220. The camera 220 captures the image based on incident light 245 received by the camera 220. The camera 220 is positioned relative to a display 210 to receive the incident light 245 that passes through a portion of the display 210 before reaching the camera 220. The portion of the display 210 may be, for example, a light-passing area of the display 210 as in the light-passing area 285. Reaching the camera can include impinging an image sensor 130 of the camera 220. The camera can be positioned adjacent to the display along an axis that is perpendicular to a planar surface of the display, such as the Z-axis of the legend 290 of FIG. 2A in the context of the mobile device 205 of FIG. 2A.

The display 210 can be a touchscreen display. The device can use a touch-sensitive surface of the touchscreen display to detect a touch input or a touch gesture input received at the touch-sensitive surface of the touchscreen display. The display 210 can include one or more sensors 260. The one or more sensors 260 can include one or more active depth sensors. The device can use the one or more active depth sensors to detect a hover input, a hover pointing input, or a hover gesture input over the display 210.

At operation 810, the device displays, on the display 210, a display image 350 that is based on the image. In some cases, the device generates the display image 350 based on the image that is captured by the camera 220 before displaying the display image 350 on the display 220. Generating the display image 350 may include modifying a size of the image using at least one of scaling and/or cropping. Scaling can include upscaling, downscaling, and/or stretching. Modifying the size of the image may include modifying the size of the image such that the display image 350 is displayed on the display 210 other than on an indicator area. Generating the display image 350 may also include processing the image, for instance by modifying at least one of a brightness, a contrast, a color saturation, a tone, a white balance, a black balance, a level, a gamma correction, a gain, a color correction, a noise filter, a sharpness, a blurring, and a red eye correction.

At operation 815, the device displays an indicator overlaid over the display image 350 at an indicator area of the display 210 while the display 210 is displaying the display image 350. The indicator area includes at least a subset of the portion of the display. Examples of the indicator of operation 815 include the indicator 310A, the indicator 310B, the indicator 310C, the indicator arrows 340, the indicator 410, and the indicator 510, and/or combinations thereof. The indicator area of the display can be at least as large as a lens of the camera. The indicator can be at least as large as a lens of the camera.

In some cases, the device may display the indicator overlaid over the display image 350 at the indicator area automatically. In some cases, the device receives an input, and the device displays the indicator overlaid over the display image 350 at the indicator area in response to receipt of the input. The input may include at least one of a touch of a touch-sensitive touchscreen surface of the display 210, a predefined gesture across the touch-sensitive touchscreen surface of the display 210, a hover over the display 210, a predefined gesture over the display 210, a voice input reciting a predefined phrase recorded by a microphone, or a combination thereof.

The indicator can include a shape around at least part of portion of the display 210. Displaying the indicator can include causing a plurality of pixels in the indicator area to display a color. The color can be black, white, grey, red, green, blue, yellow, or some mixture of these colors. Displaying the indicator can include causing a plurality of pixels in the indicator area to display a pattern or secondary image distinct from the image and from the display image 350. The indicator can be animated. For example, the indicator can blink or pulsate.

Displaying the indicator overlaid over the display image 350 at the indicator area while the display 210 is displaying the display image 350 can include modifying the display image 360 to merge the indicator with the display image 350.

The device can display an image capture user interface (UI) element 320 over an image capture UI area on the display 210. The device can receive an input at the image capture UI area. The input can be one of a touch input, a hover input, a gesture input, or any other input type discussed herein. The device can receive a second image captured by the camera 220 in response to receiving the input at the image capture UI area. The device can store the second image to a non-transitory computer-readable storage medium.

The device can receive an input at an area selection user interface (UI) area. The input can be at least one of a touch input, a hover input, a gesture input, or any other input type discussed herein. The device can select a selection area of the display image 350 in response to receiving the input at the area selection UI area. The selectable areas 540, 540A, and 540B are examples of the selection area. The area selection UI area is distinct from the selection area of the display image. The selection area of the display image can include at least a portion of the indicator area. In some cases, the device displays an area selection UI element 320 at the area selection UI area. In some cases, the device generates the area selection UI element 320 to depict a copy of at least a portion of the selection area.

The device may set an image capture parameter to a particular setting that is determined based on the selection area of the display image 350 in response to selection of the selection area. The image capture parameter can includes at least one of a focus or an exposure parameter. The exposure parameter may include at least one of an exposure time, an analog gain, a digital gain, an aperture size, an ISO, or a combination thereof. The device may set an image processing property to a particular setting that is determined based on the selection area of the display image in response to selection of the selection area. The image processing property may include at least one of a brightness, a contrast, a color saturation, a tone, a white balance, a black balance, a black level compensation, a level, a gamma correction, a gain, a color correction, a noise filter, a sharpness, a blurring, a red eye correction, or a combination thereof.

The device can receive a second image captured by the camera 220 after capture of the image. The device can determine that the second image is occluded by an occlusion, such as the occlusion 630A-C. The device can display the display image 350 on the display 210 in response to determining that the second image is occluded by the occlusion. For example, because the second image is occluded by the occlusion, the device can choose to display the display image 350 again instead of displaying the second image or a second display image that is based on the second image. In some cases, the device can receive an input, where the occlusion is associated with receipt of the input. The input can be at least one of a touch input, a hover input, a gesture input, or any other input type discussed herein. The device can select a selection area of the display image based on the input. The device can determine a setting based on the selection area of the display image, and can apply the setting. The device can receive a third image captured by the camera 220 while the setting is applied and after capture of the second image.

In some cases, the device can receive multiple cameras. In some examples, the device can receive a second image captured by a second camera. The second camera can capture the second image based on secondary incident light received by the second camera. The second camera can be positioned relative to the display 210 to receive the secondary incident light that passes through a second portion of the display 210 (e.g., a second light-passing area of the display 210) before reaching the second camera. Reaching the second camera can include impinging a second image sensor of the second camera. In some examples, the device can determine that the second image is occluded by an occlusion, and can display the display image 350 on the display 210 in response to determining that the second image is occluded by the occlusion. In some examples, the device can determine depth information corresponding to one or more objects depicted in the image and in the second image by processing the image and the second image, for example using stereoscopic image processing.

Figure 9:
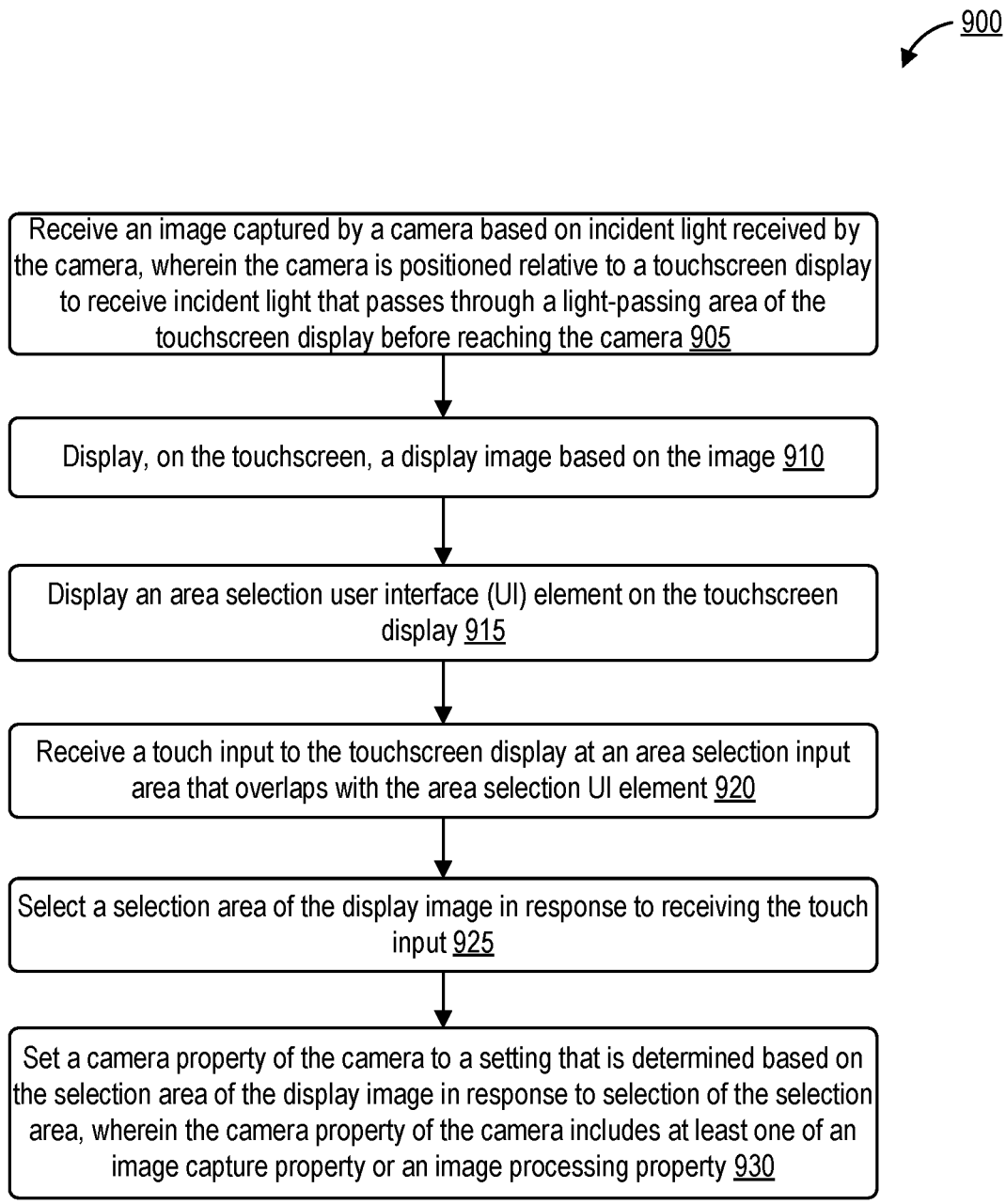
FIG. 9 is a flow diagram illustrating another example of an image processing technique.

FIG. 9 is a flow diagram illustrating an image processing technique 900. The image processing technique 900 illustrated by the flow diagram of FIG. 9 may be performed by a device. The device may be a mobile device 205, an image capture and processing system 100, an image capture device 105A, an image processing device 105B, one or more network servers of a cloud service, a computing system 1000, or some combination thereof.

At operation 905, the device receives an image captured by a camera 220. The camera 220 captures the image based on incident light 245 received by the camera 220. The camera 220 is positioned relative to a touchscreen display 210 to receive the incident light 245 that passes through a light-passing area 285 of the touchscreen display 210 before reaching the camera 220. Reaching the camera can include impinging an image sensor 130 of the camera 220. The light-passing area 285 of the touchscreen display 210 of operation 905 may be an example of the portion of the display of operation 805.

At operation 910, the device displays, on the touchscreen display 210, a display image 350 based on the image.

At operation 915, the device displays an area selection user interface (UI) element on the touchscreen display 210. The area selection UI element of operation 915 may include, for example, the area selection UI element 520 of FIG. 5, area selection UI element 720A of FIG. 7, or the area selection UI element 720B of FIG. 7.

At operation 920, the device receives a touch input to the touchscreen display 210 at an area selection input area that overlaps with the area selection UI element. In some cases, the touch input may be supplemented with, or replaced with, a hover input.

At operation 925, the device selects a selection area of the display image 350 in response to receiving the touch input. The selection area may be a selectable area including at least part of the light-passing area, such as the selectable area 540 of FIG. 5, the selectable area 540A of FIG. 7, or the selectable area 540B of FIG. 7.

At operation 930, the device sets a camera property of the camera 220 to a setting that is determined based on the selection area of the display image 350 in response to selection of the selection area. The camera property of the camera 220 includes at least one of an image capture property or an image processing property. The image capture property may include at least one of a focus and an exposure parameter. The exposure parameter may include at least one of an exposure time, an analog gain, a digital gain, an aperture size, an ISO, or a combination thereof. The image processing property may include at least one of a brightness, a contrast, a color saturation, a tone, a white balance, a black balance, a black level compensation, a level, a gamma correction, a gain, a color correction, a noise filter, a sharpness, a blurring, a red eye correction, or a combination thereof.

In some cases, at least a subset of the image processing techniques 800 and 900 illustrated by the flow diagrams of FIGS. 8-9 may be performed remotely by one or more network servers of a cloud service. In some examples, the processes described herein (e.g., the image processing techniques 800 and 900 and/or other processes described herein) may be performed by a computing device or apparatus. In one example, the image processing techniques 800 and 900 can be performed by the image capture device 105A of FIG. 1. In another example, the image processing techniques 800 and 900 can be performed by the image processing device 105B of FIG. 1. The image processing techniques 800 and 900 can also be performed by the image capture and processing system 100 of FIG. 1. The image processing techniques 800 and 900 can also be performed by the mobile device 205 of any of FIGS. 2A, 2B, 2C, 3A, 3B, 3C, 4, 5, 6, and/or 7. The image processing techniques 800 and 900 can be performed by a computing device with the architecture of the computing system 1000 shown in FIG. 10. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the image processing techniques 800 and 900. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams and flow diagrams of FIGS. 8-9 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams and flow diagrams of FIGS. 8-9 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

While FIGS. 2A-2C, 3A-3C, 4, 5, 6, and 7 all illustrate a mobile device 205, it should be understood that the mobile device 205 is just one example of a device that includes the technologies discussed herein and/or performs the techniques discussed herein. The technologies and techniques discussed herein, including the image processing techniques 800 and 900, can be performed by a mobile device 205, an image capture and processing system 100, an image capture device 105A, an image processing device 105B, one or more network servers of a cloud service, a computing system 1000, or some combination thereof.

Figure 10:
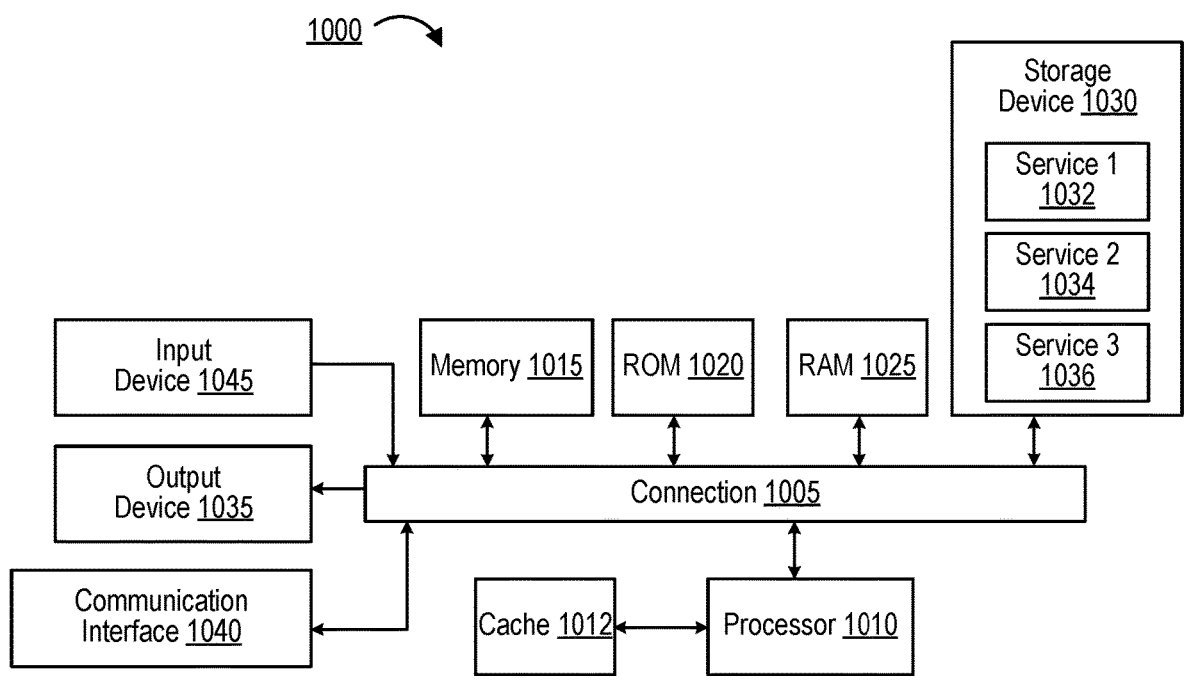
FIG. 10 is a diagram illustrating an example of a system for implementing certain aspects of the present technology.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010.

Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for image processing, the apparatus comprising: a memory; and one or more processors coupled to the memory and configured to: receive an image captured by a camera based on incident light received by the camera, wherein the camera is positioned relative to a display to receive the incident light that passes through a portion of the display before reaching the camera; display, on the display, a display image that is based on the image; and display an indicator overlaid over the display image at an indicator area of the display while the display is displaying the display image, wherein the indicator area includes at least a subset of the portion of the display.

Aspect 2: The apparatus of Aspect 1, wherein the apparatus is at least one of a mobile device, a wireless communication device, and a camera device.

Aspect 3: The apparatus of any of Aspects 1 to 2, wherein the apparatus includes at least one of the camera and the display.

Aspect 4: The apparatus of any of Aspects 1 to 3, wherein at least one of the indicator and the indicator area of the display are at least as large as an area of a lens of the camera.

Aspect 5: The apparatus of any of Aspects 1 to 4, wherein the one or more processors are further configured to: receive an input, wherein the indicator is displayed over the indicator area in response to receipt of the input.

Aspect 6: The apparatus of Aspect 5, wherein the input includes at least one of a touch of a touch-sensitive touchscreen surface of the display, a predefined gesture across the touch-sensitive touchscreen surface of the display, a hover over the display, a predefined gesture over the display, a voice input reciting a predefined phrase recorded by a microphone.

Aspect 7: The apparatus of any of Aspects 1 to 6, wherein the one or more processors are further configured to: generate the display image by modifying a size of the image using at least one of scaling and cropping.

Aspect 8: The apparatus of Aspect 7, wherein modifying the size of the image includes modifying the size of the image such that the display image is displayed on the display other than on the indicator area.

Aspect 9: The apparatus of any of Aspects 1 to 8, wherein the indicator includes a shape around at least part of the portion of the display.

Aspect 10: The apparatus of any of Aspects 1 to 9, wherein the indicator is animated.

Aspect 11: The apparatus of any of Aspects 1 to 10, wherein displaying the indicator overlaid over the display image at the indicator area while the display is displaying the display image includes modifying the display image to merge the indicator with the display image.

Aspect 12: The apparatus of any of Aspects 1 to 11, wherein the display is a touchscreen.

Aspect 13: The apparatus of any of Aspects 1 to 12, wherein the one or more processors are further configured to: display an image capture user interface (UI) element over an image capture UI area on the display; receive an input at the image capture UI area, wherein the input is one of a touch input, a hover input, and a gesture input; receive a second image captured by the camera in response to receiving the input at the image capture UI area; and store the second image to a non-transitory computer-readable storage medium.

Aspect 14: The apparatus of any of Aspects 1 to 13, wherein the one or more processors are further configured to: receive an input at an area selection user interface (UI) area, wherein the input is one of a touch input, a hover input, and a gesture input; and select a selection area of the display image in response to receiving the input at the area selection UI area, wherein the area selection UI area is distinct from the selection area of the display image.

Aspect 15: The apparatus of Aspect 14, wherein the selection area of the display image includes at least at least a portion of the indicator area.

Aspect 16: The apparatus of any of Aspects 14 or 15, wherein the one or more processors are further configured to: set an image capture parameter associated with the camera to a particular setting that is determined based on the selection area of the display image in response to selection of the selection area, wherein the image capture parameter includes at least one of a focus and an exposure parameter.

Aspect 17: The apparatus of any of Aspects 14 to 16, wherein the one or more processors are further configured to: setting an image processing property to a particular setting that is determined based on the selection area of the display image in response to selection of the selection area, wherein the image processing property is one of a brightness, a contrast, a color saturation, a tone, a white balance, a black balance, a black level compensation, a level, a gamma correction, a gain, a color correction, a noise filter, a sharpness, a blurring, and a red eye correction.

Aspect 18: The apparatus of any of Aspects 14 to 17, wherein the one or more processors are further configured to: display an area selection UI element at the area selection UI area.

Aspect 19: The apparatus of Aspect 18, wherein the one or more processors are further configured to: generate the area selection UI element to depict a copy of at least a portion of the selection area.

Aspect 20: The apparatus of any of Aspects 1 to 19, wherein the one or more processors are further configured to: receive a second image captured by the camera after capture of the image; determine that the second image is occluded by an occlusion; and display the display image on the display in response to determining that the second image is occluded by the occlusion.

Aspect 21: The apparatus of Aspect 20, wherein the one or more processors are further configured to: receive an input, wherein the occlusion is associated with receipt of the input, wherein the input is one of a touch input, a hover input, and a gesture input; select a selection area of the display image based on the input; determine a setting based on the selection area of the display image; apply the setting; and receive a third image captured by the camera while the setting is applied and after capture of the second image.

Aspect 22: The apparatus of any of Aspects 1 to 21, wherein the one or more processors are further configured to: receive a second image captured by a second camera based on secondary incident light received by the second camera, wherein the second camera is positioned relative to the display to receive the secondary incident light that passes through a second portion of the display before reaching the second camera.

Aspect 23: The apparatus of Aspect 22, wherein the one or more processors are further configured to: determine that the second image is occluded by an occlusion, wherein the display image is displayed in response to determining that the second image is occluded by the occlusion.

Aspect 24: The apparatus of any of Aspects 22 or 23, wherein the one or more processors are further configured to: generate the display image based on the image and the second image.

Aspect 25: The apparatus of any of Aspects 1 to 24, wherein the one or more processors are further configured to: determine depth information corresponding to one or more objects depicted in the image and in the second image by processing the image and the second image.

Aspect 26: A method of processing, the method comprising: receiving an image captured by a camera based on incident light received by the camera, wherein the camera is positioned relative to a display to receive the incident light that passes through a portion area of the display before reaching the camera; displaying, on the display, a display image that is based on the image; and displaying an indicator overlaid over the display image at an indicator area of the display while the display is displaying the display image, wherein the indicator area includes at least a subset of the portion of the display.

Aspect 27: The method of Aspect 26, wherein the method is performed by a mobile device comprising the camera and the display.

Aspect 28: The method of any of Aspects 26 to 27, wherein at least one of the indicator and the indicator area of the display are at least as large as an area of a lens of the camera.

Aspect 29: The method of any of Aspects 26 to 28, further comprising: receiving an input, wherein the indicator is displayed overlaid over the indicator area in response to receipt of the input.

Aspect 30: The method of Aspect 29, wherein the input includes at least one of a touch of a touch-sensitive touchscreen surface of the display, a predefined gesture across the touch-sensitive touchscreen surface of the display, a hover over the display, a predefined gesture over the display, a voice input reciting a predefined phrase recorded by a microphone.

Aspect 31: The method of any of Aspects 26 to 30, further comprising: generating the display image by modifying a size of the image using at least one of scaling and cropping, wherein modifying the size of the image includes modifying the size of the image such that the display image is displayed on the display other than on the indicator area.

Aspect 32: The method of any of Aspects 26 to 31, wherein the indicator includes a shape around at least part of the portion of the display.

Aspect 33: The method of any of Aspects 26 to 32, wherein displaying the indicator overlaid over the display image at the indicator area while the display is displaying the display image includes modifying the display image to merge the indicator with the display image.

Aspect 34: The method of any of Aspects 26 to 33, wherein the display is a touchscreen.

Aspect 35: The method of any of Aspects 26 to 34, further comprising: displaying an image capture user interface (UI) element over an image capture UI area of the display image; receiving an input at the image capture UI area, wherein the input is one of a touch input, a hover input, and a gesture input; receiving a second image captured by the camera in response to receiving the input at the image capture UI area; and storing the second image to a non-transitory computer-readable storage medium.

Aspect 36: The method of any of Aspects 26 to 35, further comprising: receiving an input at an area selection user interface (UI) area, wherein the input is one of a touch input, a hover input, and a gesture input; and selecting a selection area of the display image in response to receiving the input at the area selection UI area, wherein the area selection UI area is distinct from the selection area of the display image.

Aspect 37: The method of Aspect 36, wherein the selection area of the display image includes at least a portion of the indicator area.

Aspect 38: The method of Aspect 37, further comprising: setting an image capture parameter to a particular setting that is determined based on the selection area of the display image in response to selection of the selection area, wherein the image capture parameter includes at least one of a focus and an exposure parameter.

Aspect 39: The method of any of Aspects 37 or 38, further comprising: setting an image processing property to a particular setting that is determined based on the selection area of the display image in response to selection of the selection area, wherein the image processing property is one of a white balance, a black level compensation, a gamma correction, a gain, a color correction, a color saturation, a noise filter, a contrast control, a brightness control, a tone mapping, a sharpness, a blurring, and a red eye correction.

Aspect 40: The method of any of Aspects 26 to 39, further comprising: receiving a second image captured by the camera after capture of the image; determining that the second image is occluded by an occlusion; and displaying the display image on the display in response to determining that the second image is occluded by the occlusion.

Aspect 41: The method of Aspect 40, further comprising: receiving an input, wherein the occlusion is associated with receipt of the input, wherein the input is one of a touch input, a hover input, and a gesture input; selecting a selection area of the display image based on the input; determining a setting based on the selection area of the display image; applying the setting; and receiving a third image captured by the camera while the setting is applied and after capture of the second image.

Aspect 42: The method of any of Aspects 26 to 41, further comprising: receiving a second image captured by a second camera based on secondary incident light received by the second camera, wherein the second camera is positioned relative to the display to receive the secondary incident light that passes through a second portion of the display before reaching the second camera.

Aspect 43: The method of any of Aspects 26 to 42, further comprising: determining that the second image is occluded by an occlusion, wherein the display image is displayed in response to determining that the second image is occluded by the occlusion.

Aspect 44: The method of any of Aspects 26 to 43, further comprising: determining depth information corresponding to one or more objects depicted in the image and in the second image by processing the image and the second image.

Aspect 45: A non-transitory computer-readable medium having stored thereon instructions that, when executed by one or more processors, cause the one or more processors to perform operations according to any of aspects 1 to 44.

Aspect 46: An apparatus comprising one or more means for performing operations according to any of aspects 1 to 44.

What is claimed is:

1. An apparatus for imaging, the apparatus comprising:
at least one memory; and
at least one processor coupled to the at least one memory and configured to:
  receive an image of a scene captured by a camera based on incident light received from the scene by the camera, wherein the camera is positioned relative to a display to receive the incident light from the scene that passes through a portion of the display before reaching the camera;
  display, on the display, a display image that is based on the image; and
  detect an interaction between a tip of an input element and a user interface (UI) area of the apparatus to receive a user input through the UI area, the user input configured to designate a selection area of the display image, wherein at least a portion of the selection area of the display image is displayed on the portion of the display while the display image is displayed on the display, wherein the UI area is distinct from the portion of the display, wherein the UI area is positioned to receive the user input without the tip of the input element occluding a field of view of the camera while the user input is received through the UI area.

2. The apparatus of claim 1, wherein the apparatus is at least one of a mobile device, a wireless communication device, or a camera device.

3. The apparatus of claim 1, wherein the apparatus includes at least one of the camera or the display.

4. The apparatus of claim 1, wherein the display image is the image.

5. The apparatus of claim 1, wherein the display image is a processed variant of the image.

6. The apparatus of claim 1, wherein the display is a touchscreen display, wherein the UI area includes at least a portion of a touch-sensitive layer of the touchscreen display, and wherein the user input includes a touch input detected by the touch-sensitive layer of the touchscreen display.

7. The apparatus of claim 1, the at least one processor configured to:
  receive a second image captured by the camera after capture of the image; and
  determine that the second image is at least partially occluded by an occlusion, wherein the display image is displayed on the display based on the second image being at least partially occluded by the occlusion.

8. The apparatus of claim 7, wherein the occlusion is associated with receipt of the user input, wherein the user input includes at least one of a touch input, a hover input, or a gesture input.

9. The apparatus of claim 7, the at least one processor configured to:
  determine a setting based on the selection area of the display image;
  apply the setting; and
  receive a third image captured by the camera while the setting is applied and after capture of the second image.

10. The apparatus of claim 1, the at least one processor configured to:
  determine a setting based on the selection area of the display image;
  apply the setting; and
  receive a second image captured by the camera while the setting is applied and after capture of the image.

11. The apparatus of claim 10, wherein the setting is applied to an image capture parameter, wherein the image capture parameter includes at least one of a focus parameter or an exposure parameter.

12. The apparatus of claim 1, the at least one processor configured to:
  determine a setting based on the selection area of the display image;
  receive a second image captured by the camera; and
  apply the setting to the second image.

13. The apparatus of claim 12, wherein the setting is applied to an image processing parameter, wherein the image processing parameter includes at least one of a brightness, a contrast, a color saturation, a tone, a white balance, a black balance, a black level compensation, a level, a gamma correction, a gain, a color correction, a noise filter, a sharpness, a blurring, or a red eye correction.

14. The apparatus of claim 1, further comprising:
  a button, wherein the UI area includes the button, and wherein the user input includes a press of the button.

15. The apparatus of claim 1, wherein the UI area is a part of the display that is distinct from the selection area of the display image and from the portion of the display, wherein the user input includes at least one of a touch input, a hover input, or a gesture input.

16. The apparatus of claim 15, wherein the display is a touchscreen, wherein the UI area includes a virtual touchscreen button, wherein the user input includes a button press of the virtual touchscreen button of the UI area.

17. The apparatus of claim 1, wherein the UI area is configured to control a cursor, wherein the user input includes use of the UI area to manipulate the cursor to indicate the selection area.

18. The apparatus of claim 15, wherein the at least one processor is configured to:
display an area selection UI element in the UI area.

19. The apparatus of claim 18, wherein the at least one processor is configured to:
generate the area selection UI element to depict a representation of at least a portion of the selection area of the display image.

20. The apparatus of claim 1, the at least one processor configured to:
display an indicator overlaid over the display image at an indicator area of the display while the display is displaying the display image, wherein the indicator area overlaps with the portion of the display through which the incident light passes, wherein the indicator is indicative of a position of the camera, wherein the selection area of the display image includes at least a portion of the indicator area.

21. The apparatus of claim 1, the at least one processor configured to:
determine a depth of an object in the scene based on the selection area of the display image depicting at least a portion of the object; and
determine a setting based on the depth of the object, the setting configured to be applied to a second image to be captured using the camera.

22. The apparatus of claim 1, the at least one processor configured to:
determine an attribute of a depiction of an object in the display image, the object being part of the scene, the depiction of the object overlapping with the selection area of the display image, the attribute including at least one of a brightness, a level of contrast, a sharpness, a level of blur, a color, a hue, a saturation level, a tone, or a level of noise; and
determine a setting based on the attribute of the depiction of the object, the setting configured to be applied to a second image to be captured using the camera.

23. A method of imaging, the method comprising:
receiving an image of a scene captured by a camera of an apparatus based on incident light received from the scene by the camera, wherein the camera is positioned relative to a display of the apparatus to receive the incident light from the scene that passes through a portion of the display before reaching the camera;
displaying, on the display, a display image that is based on the image; and
detecting an interaction between a tip of an input element and a user interface (UI) area of the apparatus to receive a user input through the UI area, the user input configured to designate a selection area of the display image, wherein at least a portion of the selection area of the display image is displayed on the portion of the display while the display image is displayed on the display, wherein the UI area is distinct from the portion of the display, wherein the UI area is positioned to receive the user input without the tip of the input element occluding a field of view of the camera while the user input is received through the UI area.

24. The method of claim 13, wherein the display is a touchscreen display, wherein the UI area includes at least a portion of a touch-sensitive layer of the touchscreen display, and wherein the user input includes a touch input detected by the touch-sensitive layer of the touchscreen display.

25. The method of claim 23, further comprising:
receiving a second image captured by the camera after capture of the image; and
determining that the second image is at least partially occluded by an occlusion, wherein the display image is displayed on the display based on the second image being at least partially occluded by the occlusion.

26. The method of claim 23, further comprising:
determining a setting based on the selection area of the display image;
applying the setting; and
receiving a second image captured by the camera while the setting is applied and after capture of the image.

27. The method of claim 23, further comprising:
determining a setting based on the selection area of the display image;
receiving a second image captured by the camera; and
applying the setting to the second image.

28. The method of claim 23, wherein the UI area includes a button, and wherein the user input includes a press of the button.

29. The method of claim 23, wherein the UI area is a part of the display that is distinct from the selection area of the display image and from the portion of the display, wherein the user input includes at least one of a touch input, a hover input, or a gesture input.

30. A non-transitory computer-readable medium having stored thereon instructions that, when executed by one or more processors, cause the one or more processors to:
receive an image of a scene captured by a camera of an apparatus based on incident light received from the scene by the camera, wherein the camera is positioned relative to a display of the apparatus to receive the incident light from the scene that passes through a portion of the display before reaching the camera;
display, on the display, a display image that is based on the image; and
detect an interaction between a tip of an input element and a user interface (UI) area of the apparatus to receive a user input through the UI area, the user input configured to designate a selection area of the display image, wherein at least a portion of the selection area of the display image is displayed on the portion of the display while the display image is displayed on the display, wherein the UI area is distinct from the portion of the display, wherein the UI area is positioned to receive the user input without the tip of the input element occluding a field of view of the camera while the user input is received through the UI area.

* * * * *